United States Patent [19]

Nakano

[11] Patent Number: 5,198,148
[45] Date of Patent: Mar. 30, 1993

[54] CHOLESTERIC LIQUID CRYSTAL COMPOSITION, COLOR-FORMING LIQUID CRYSTAL COMPOSITE PRODUCT, METHOD FOR PROTECTING LIQUID CRYSTAL AND COLOR-FORMING LIQUID CRYSTAL PICTURE LAMINATED PRODUCT

[75] Inventor: Seisuke Nakano, Niigata, Japan

[73] Assignee: Shinko Electric Works Co., Ltd., Niigata, Japan

[21] Appl. No.: 537,679

[22] Filed: Jun. 14, 1990

[30] Foreign Application Priority Data

Jun. 17, 1989 [JP] Japan .................................. 1-155186
Jul. 17, 1989 [JP] Japan .................................. 1-184234

[51] Int. Cl.$^5$ ...................... C09K 19/52; C09K 19/36
[52] U.S. Cl. ............................. 252/299.01; 252/299.7
[58] Field of Search ..................... 350/350 R, 350 S; 252/299.01, 299.7

[56] References Cited

U.S. PATENT DOCUMENTS

| | | | |
|---|---|---|---|
| 3,580,864 | 5/1971 | Goldberg et al. | 252/299.7 X |
| 3,600,060 | 8/1971 | Churchill et al. | 350/331 R X |
| 3,620,889 | 11/1971 | Baltzer | 428/1 X |
| 3,642,348 | 2/1972 | Wysocki et al. | 350/346 X |
| 3,655,971 | 4/1972 | Haas et al. | 430/19 X |
| 3,789,225 | 1/1974 | Leder | 350/331 |
| 3,872,050 | 3/1975 | Benton et al. | 524/774 X |
| 3,908,052 | 9/1975 | Sanders et al. | 428/1 X |
| 4,022,706 | 5/1977 | Davis | 428/1 X |
| 4,064,872 | 12/1977 | Caplan | 374/162 X |
| 4,182,700 | 1/1980 | Benton et al. | 524/871 X |
| 4,301,023 | 11/1981 | Schuberth | 252/299.7 |
| 4,301,054 | 11/1981 | Buirley et al. | 523/210 X |
| 4,461,715 | 7/1984 | Lu et al. | 252/299.1 |
| 4,579,422 | 4/1986 | Simoni et al. | 350/331 R |
| 4,637,896 | 1/1987 | Shannon | 252/299.7 |
| 4,859,360 | 8/1989 | Suzuki et al. | 252/299.7 |

FOREIGN PATENT DOCUMENTS

| | | | |
|---|---|---|---|
| 0034298 | 8/1981 | European Pat. Off. | 252/299.7 |
| 0140358 | 2/1980 | Fed. Rep. of Germany | 252/299.7 |
| 0252884 | 12/1987 | Fed. Rep. of Germany | 252/299.7 |
| 0044419 | 3/1983 | Japan | 252/299.01 |
| 0487923 | 1/1976 | U.S.S.R. | 252/299.5 |
| 0595661 | 2/1978 | U.S.S.R. | 252/299.7 |

OTHER PUBLICATIONS

Sackmann et al., "Fluorescence Polarization Measurements on Molecules Oriented in Liquid Crystals", Chemical Physics Letters, vol. 4, No. 9 (Jan. 1970).

*Primary Examiner*—Robert L. Stoll
*Assistant Examiner*—C. Harris
*Attorney, Agent, or Firm*—Fulbright & Jaworski

[57] ABSTRACT

Film, fiber and coating ink manufactured by using liquid crystals comprising a combination of (a) at least one compound of each from Group (I) composed of cholesteryl alkyl carboxylate, cholesteryl alkenyl carboxylate, cholesteryl 3-chloropropionate and cholesteryl halogen, Group (II) composed of cholesteryl alkyl carbonate and cholesteryl alkenyl carbonate, and Group (III) composed of cholesteryl aromatic alkyl or alkenyl carboxylate, cholesteryl aromatic alkyl or alkenyl carbonate, cholesteryl alicyclic carboxylate and cholesteryl alicyclic dicarboxylate, and no less than six compounds in total; (b) containing 22.0 to 7.5 wt % of compounds selected from Group (I), 12.0 to 75.0 25% of compounds selected from Group (II), and 7.0 to 35.0 wt % of compounds selected from Group (III); and (c) stabilizing liquid crystal by inhibiting each other's ingredients from crystallizing. A process for coating a printed liquid crystal image with electromagnetic radiation curing resin and forming liquid crystal-protecting film by curing the coating film before defects including pinhole and breakage of film are generated. Also included is a multilayer laminated product of liquid crystal image manufactured by laminating liquid crystal images with different color temperatures to change a visible image with the ambient temperature.

8 Claims, No Drawings

CHOLESTERIC LIQUID CRYSTAL COMPOSITION, COLOR-FORMING LIQUID CRYSTAL COMPOSITE PRODUCT, METHOD FOR PROTECTING LIQUID CRYSTAL AND COLOR-FORMING LIQUID CRYSTAL PICTURE LAMINATED PRODUCT

BACKGROUND OF THE INVENTION

1. Field of the invention

The present invention relates to cholesteric liquid crystal composition having arbitrary color-forming temperature range from −5° C. to +45° C.; a color-forming liquid crystal composite products such as film, fiber, coating material, ink or the like using said compositions; a method for protecting printed or pictured liquid crystals; and a color-forming liquid crystal picture laminated products whose visible pictures on a same surface can vary depending upon temperature-variation.

2. Prior art

As for liquid crystals which will provide reversible color change due to temperature-change, steroidal cholesteric liquid crystals (e.g. cholesteryl fatty esters) and color-forming chiral pneumatic liquid crystals are known. In addition, as for steroidal cholesteric liquid crystals, they can be used as color-forming liquid crystals. Cholesteryl esters as a single substance are solid at ordinary temperatures except for few exceptions, and generally when they have lower or higher melting points, they can be liquid crystal only at about 50° C., or at about 200° C. respectively. Therefore, some kinds of these esters are selected, and then they are melt-mixed at a specified mixing ratio thereof for obtaining a lowered solidifying point to allow the mixtures to form color in a predetermined temperature range.

As for even such mixed cholesteric liquid crystals carefully prepared, if they are once left below the color-forming temperatures, they are easily solid-crystallized and can not be again liquid crystal even when heated up to said coloring temperatures. As far as mixed cholesteric liquid crystals are concerned, such phenomena can be considered to occur because of their rapid crystallization based on the same principles as in those of metamorphic differentiation or recrystallization, with the components or crystals thereof changed with no fusion as dealt with in lithology, etc.

As an effective means for preventing such crystallization, microencapsulization can be given. Microencapsulization can hold liquid crystals in a condition which permits no solid-crystallization thereof under ordinarily conditions by the pulverizing of the solid-crystallizable liquid crystals. (Also in other liquid substances, when they are fine particles, they are left liquid even at the temperatures below their solidifying points.).

Because of such reasons, any cholesteric liquid crystal of steroid family which is used about at room temperatures has been microencapsulized.

When microencapsulized liquid crystals, however, are applied for printing, usually they are given serious restrictions due to easy breaks in the capsules caused by printing pressure.

In order to make microencapsulized liquid crystals serviceable in practice, they are needed to be dispersed into liquid binders, however, they are used only in an amount up to about 30 wt % relative to the total amount of dry residue after the removal of solvent therein. Therefore, the face on which the liquid crystal is applied will have lowered clarity resulted from irregular reflection as well as coloring due to the contamination by the crusts of capsules used in the microencapsulization process. Accordingly, a jewel like beautiful coloring due to the great refractive index of light (about 20 times as strong as that of a rock crystal) being the characteristic of cholesteric liquid crystals is lost to have reduced decorative value.

On the other hand, the color-forming chiral pneumatic liquid crystals are stable than the cholesteric mixed liquid crystals of steroid family, however, the use of the former liquid crystals are limited because of their extremely narrow color-forming ranges.

Cholesteryl fatty ester liquid crystals which can be stably storaged for more than six months at room temperatures were disclosed by Japanese Patent Laid-open No. 48559/1985 (Applicant: U.S. RPR Inc.). The cholesteric liquid crystals are used for coloration at a temperature not less than 20° C. (The lowest color-forming temperature of the exemplary liquid crystals of the examples of said Patent was 37° C.), however, their color-forming temperature ranges are so extremely expanded to higher side of temperature that they can not be available for the most commonly used applications which require color-formations corresponding to the temperature-variation in the vicinity of room temperatures.

The present inventors, therefore, for improving these problems, have made various investigations and as a result, have developed cholesteric liquid crystal compositions which are stable for a long period of time and; therefore, require no microencapsulization (Japanese Patent Application. No.155186/1989). Accordingly, conventional microencapsulizations have been no more needed, moreover, they are stable liquid crystal compositions for a long period and are available for the processing of fibers, dispersion coatings, etc. Nevertheless, the surface of the liquid crystal picture patterns which are obtained by means of the direct printing or picturing of the base boards made of plastics, paper, metals, etc., being different from microencapsulization liquid crystal or solid matrix agent dispersing liquid crystal, are bare-mesomorphic; therefore, said surfaces are of high viscous liquid, and can not be touched by our fingers without using protecting coating, moreover easily contaminated owing to environmental conditions. The practical use thereof in said conditions are rare, and even if protecting coatings are applied thereto, such coatings necessarily have no adverse effect on the printed or pictured liquid crystal picture patterns, also adhere closely to the patterns without containing air bubbles, as well as are transparent and tough.

Conventionally, a liquid crystal thermography and liquid crystal thermometer, etc. for practical use, which provide coloration-change according to temperature-variation usually have a construction comprising a sheet of film-like dry solid sandwiched between a surface-protecting film and a black backing film using, and said dry solid is made from a binder having an microencapsulized liquid crystal dispersed. A particular one point, therefore, on the film can display its color-forming change corresponding specified one type of liquid crystal. Consequently, if the color-forming range of the film is extended, the sensitivity to a temperature-change becomes poor and resulting in decreased sensing density not to response to small temperature-change. Contrary, if the film is allowed to be responsible to a small temperature-change, its sensing density will become increased to have disadvantageously narrow color-forming ranges. Therefore, conventional liquid crystal thermometers unavoidably have liquid crystals of different color-forming ranges with each of which being located independently in lines on one surface.

Since the conventional threads being one of liquid crystal fiber products (hereinafter referred to as liquid crystal threads) forms color by using microencapsulized liquid crystals; therefore, in order to obtain enlarged range of color-forming temperatures, plural types of microencapsulized liquid crystals having different color-forming temperatures each are allowed to be used as a mixture. In this case, since the liquid crystals other than one type of liquid crystal under color-formation at a temperature will not develop colors at this temperature, the density of microencapsulized liquid crystals under color-formation become low, resulting in dark coloration being not effective for practical use.

SUMMARY OF THE INVENTION

The first object of the present invention is to provide color-forming cholesteric mixed liquid crystal compositions which can be stably stored for a long time and are available for films, printing inks, coatings, fibers, etc. and which have an arbitrary color-forming range within the range between $-5°$ C. and $+45°$ C. without microencapsulization of liquid crystals; and to provide color-forming liquid crystals composite products prepared by using the compositions.

The second object of the present invention is to provide a method of forming a transparent and tough protecting film which will give no adverse effects on the liquid crystal picture patterns printed or pictured on a base board; adhere closely to the patterns; and contain no bubbles therein.

The third object of the present invention is to provide color-forming liquid crystal picture laminated sheets, wherein the liquid crystals are laminated so that they will provide changed visible picture caused by the alternation of the liquid crystals under coloration with other liquid crystals, and said alternation occurs when the liquid crystals under coloration exceed their color-forming limits owing to temperature-change; therefore, said laminated sheets not only can be employed for a high sensitivity and wider range of color-forming applications, but also for novel uses such as neo-sensual graphic design, etc.

The fourth object of the present invention is to provide color-forming liquid crystal laminated thread, since the thread is made up of in a layer-like as in the case of the third object; the color-formation of said laminated thread can be sensitively changed according to environmental temperature change as well as the laminated thread can form color clearly over a wider range of temperature; therefore, the introduction of extremely novel sense into interior upholsteries, dress accessories design, etc. is attainable.

In addition, some of liquid crystal compositions according to the present invention are available not only for thermo-effective type, but also for electric field-effective, resulting in clear coloration thereof by an electric field.

The cholesteric liquid crystal compositions are characterized in that said compositions contain a total of at least six types of the following compounds comprising at least one type of compound selected from the cholesteryl esters of group I below, at least one type compound selected form the cholesteryl esters of group II below, and at least one type compound selected from the cholesteryl esters of group III below; and a total amount of the cholesteryl esters of group I ranges between 22.0 and 75.0 wt %, a total amount of the cholesteryl esters of group II ranges between 12.0 and 70.0 wt % and a total amount of the cholesteryl esters of group III ranges between 7.0 and 35.0 wt %. In the descriptions below, Ch can contain cholestanyl esters to some extent and it represents the cholesteryl shown by $C_{27}H_{45}$, and all the cholesteryl esters comprising groups I, II and III may be referred to as "Ch.ester"

Group I (Ch.fatty ester):

(a) Ch.alkyl carboxylate represented by the general formula $C_nH_{2n+1}COO.Ch$, wherein n is an integer of 4 to 11.

(b) Ch.alkenyl carboxylate represented by the general formula $C_nH_{2n-1}COO.Ch$, wherein n is an integer of 4 to 17.

(c) Ch.3-chloropropionate.

(d) Ch.halo.

Group II (Ch.aliphatic alcohol carbonate):

(e) Ch.alkyl carbonate represented by the general formula $C_nH_{2n+1}OCOO.Ch$, wherein n is an integer of 3 to 18.

(f) Ch.alkenyl carbonate represented by the general formula $C_nH_{2n-1}OCOO.Ch$, wherein n is an integer of 3 to 18.

Group III (carboxylate and carbonate of Ch.carbocyclic compounds):

(g) Carboxylate and carbonate of Ch.aromatic compound represented by the general formula:

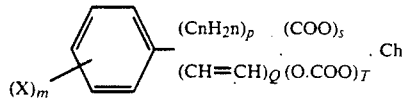

wherein, P is 0 or 1, Q is 0 or 1, P+Q is 0, 1 or 2, S is 0 or 1, T is 0 or 1, S+T is 1, n is 0 or an integer of 1 to 6, m is 0, 1 or 2, X is an alkyl group having 1 to 4 carbon atoms, an alkoxyl group having 1 to 3 carbon atoms, a nitro group, an amino group, a carboxyl group, or halo group.

(h) Carboxylate and carbonate of Ch.4 to 7 members of alicyclic compound.

(i) Monoester being hydrogen dicarboxylate of Ch.4 to 7 members of alicyclic compound.

The cholesteric liquid crystal compositions of the present invention preferably contain the following combinations of liquids crystals.

1) A combination of a component of (a) (of which content is preferably 12.0 to 50.0 wt %) such as Ch.pelargonic acid being one type of the Ch. fatty esters of the group I and a component of (e) (of which content is preferably 2.0 to 20.0 wt %) such as Ch.lauryl carbonate being one type of the group II, i.e., Ch.aliphatic alcohol carbonates.

2) A combination of a component of (a) (of which use is preferably 12.0 to 50.0 wt %) such as Ch.pelargonic acid being one type of the group I and a component of (f) (of which use is preferably 2.0 to 75.0 wt %) such as Ch.oleyl carbonate being one type of the group II, 3) A combination of a component of (a) such as Ch.pelargonic acid being one type of the esters of the group I and a component of (g) such as Ch.benzoic acid being one type of the group III, i.e., carboxylate and carbonate of Ch.aromatic compound.

In addition, as for the liquid crystal compositions, when a component (a) of Ch.alkyl carboxylic acid being one type of the group I and/or a component (e) of Ch. alkyl carbonate being one type of the group II are used, preferably each of the components has ethyl group as side chain at the alkyl group portion of the component, and 2.0 to 25.0 wt % (a) and/or (e) components are preferably contained in a corresponding composition. Further, when a component (b) of Ch.alkenyl carboxylic acid being one type of the group I and/or a component (f) of Ch.alkenyl carbonate being one type of the group II are used, preferably each component has ethyl group as side chain at the alkenyl group portion of the component, and 2.0 to 25.0 wt % (b) and/or (f) components are preferably contained in a corresponding composition.

The color-forming liquid crystal compounded products of the present invention are a liquid crystal film comprising the patterns of said liquid crystal compositions sandwiched by between a base board and a transparent protecting film; a liquid crystal film and a liquid crystal fiber, each of which is a mixture of said liquid crystal compositions and transparent high molecular substances; and a liquid crystal coating or a liquid crystal ink (they may be referred to as liquid crystal fluid as a general term) comprising liquid crystal compositions and transparent high molecular substances dispersed or dissolved into solutions.

A method of protecting the liquid crystals according to the present invention which comprises coating an electromagnetic radiation curing resin on the liquid crystal patterns including their peripheries, which are printed or pictured on a base board, with a thickness not less than those of the liquid crystal patterns; at the same time or immediately after the above coating operation, applying electromagnetic radiation to the coated resin to be cured; and thereby forming a transparent protecting film. As for liquid crystals used here, the liquid crystal compositions of the present invention are desirable.

The color-forming liquid crystal picture laminated sheet of the present invention comprising plural types of liquid crystals of different color-forming temperatures printed or pictured in laminate on a base board by applying transparent protecting film to each liquid crystal. Here, as for a method of forming a transparent film, said method of protecting liquid crystals according to the invention is desirable. As for liquid crystals, the liquid crystal compositions of the invention is desirable. And as for base boards, black plastic films are desirable.

Further, the color-forming liquid crystal picture laminated fibers of the present invention comprising plural types of liquid crystals of different color-forming temperatures printed or pictured in parallel lines and in laminate on a transparent or black continuous film by applying a transparent protecting film to each liquid crystal, and comprising the resulting patterns cut along said each parallel line. Then, as for liquid crystals, the liquid crystal compositions such as described before according to the present invention are desirable.

DETAILED DESCRIPTION OF THE INVENTION

The Liquid crystal compositions of the present invention comprises at least six types of, preferably not less than seven types of cholesteryl esters mixed. As far as one type of cholesteryl esters mixed, for example, a cholesteryl ester of (a) is concerned, when the content of (a) increases gradually from 0, and physical influence upon the liquid crystals mixture due to the addition of said ester is regarded as an effect, in the beginning the effect forms an approximately linear slope at a constant temperature, however, at the point when the content of (a) exceeds its specific content value, the effect begins to rise steeply with a curve depicted.

If the content at the point where said curved starts is regarded as the maximum allowable content of (a) at a constant temperature for a completed liquid crystals mixture, no solid-crystallization will occur due to the cholesteryl ester (a) as long as the content is not more than the maximum allowable value (or as long as its temperature is not below said constant temperature). Accordingly, the present inventors assumed that when the content of each of cholesteryl esters constituting a liquid crystals mixture system is not more than its specific maximum allowable content and kept at a temperature not less than a specified temperature, no solid-crystallization will occur except that it is chemically deteriorated and based on such assumptions the inventors have investigated such cholesteric liquid crystals mixtures, however, liquid crystals of steroid series were generally greatly temperature dependent; and with decreasing temperatures their maximum allowable contents were decreased beyond our expectation, having made our invention difficult. This is resulted from the fact that according to the actions considered to be the same as those of component-change or recrystallization resulted from allowing said liquid crystals to stand in a room with no heater in winter or to store them in a refrigerator, new solid phase having a composition different from the starting one is crystallized by separating from a mixed liquid crystals.

Whereas, if the number of the types of cholesteryl esters to be mixed is increased to decrease the content of each cholesteryl ester, in spite of there are many types of cholesteryl esters, few of them can contribute to color-formation or not contribute to color-formation but not to worsen it, and the increasement of number of cholesteryl esters to be mixed makes color-forming temperatures too decreased and gives poor color-formation, resulting in unsuitable products for practical use.

Some of liquid crystals other than cholesteryl esters and some of other kinds of substances such as additives, by addition thereof, can make color-formation clearly or may have an effect for preventing crystalization, nevertheless, if they are employed in place of cholesteryl ester, they have no special advantages but rather have significant effect for decreasing color-forming temperature; therefore, they could not be employed as principal components in the present invention.

As mentioned above, some of the liquid crystal substances of cholesteryl ester series, particularly at about their maximum allowable contents, significantly increase, decrease or not effect the maximum allowable contents of all or some of other cholesteryl esters to be mixed. In the present invention, it was essential that the exclusion of the liquid crystals allowing maximum allowable contents to be decreased, and the operations of selection of the liquid crystals which have great maximum allowable contents and will increase maximum allowable contents of other cholesteryl esters mixed under the preferential considerations of their effects on color-forming range and color-forming properties.

Therefore, it was needed to prepare a many kinds of specimens and to conduct tests for a long time. In addition, we had to give considerations to the unavoidable practical problems such as oxidation resistance, resistance to ultraviolet, etc.

Generally, even if the cholesteryl ester mixed liquid crystals, being color-forming at about room temperatures, are stable for a long period at such temperature, when environmental temperatures are kept at less than about 5° C. for a long time, they tend to crystallize easily.

Even in the case when mixed liquid crystals can not crystallize due to the increased viscosity resulted from their glass transition, if the environmental temperature rises to be kept only for a short time and subsequently drops to a low temperature, the mixed liquid crystals will solid-crystallize within extremely short periods of days.

We, therefore, in an anti-solid-crystallization test, stored the specimens at 0° C. to 2° C. and allowed them to stand at the same temperatures for two months, and waited the growth of nuclides which accelerates crystallization-separation, then gave the color-forming temperatures or just below them for 0.5 to 3 hours every 3 to 4 weeks to cool them again to the original low temperature and repeated such storage operations.

In addition, as for a cholesteryl ester mixed liquid crystals system, it has viscosity higher than those of other liquid crystals systems; therefore, unless it is once returned to isotropic liquid state its processing histories of processing tend to remain as stress, which will induce solid-crystallization. For example, in the case of screen printing, etc., strong shear stress is applied; therefore, printed patterns are needed to be annealed for the removal of residual stress. Nevertheless, in most cases, said liquid crystals can not be heated to a high temperature allowing them to be an isotropic liquid, and if heated, increasing cohesive force produced during their returning to liquid crystal state will destroy the patterns of liquid crystals.

In addition, high temperature-annealing after the application of protecting film tends to cause the evolution of bubbles in spite of said patterns being protected. Then, annealing at about 100° C., leading to isotropic liquid, can not commonly be employed.

Accordingly, as for printing specimens, they were printed at 47° C.–52° C. by using a 350–500 mesh screen but with no solvent, and then the printed patterns were annealed at 60° C.–70° C. for 2–3 minutes, then applied with a protecting film, and annealed at 65° C. for 1–1.5 minutes for the removal of the stress given by the operations during said protecting film application. As for the formation of the protecting film a method of protecting liquid crystals according to the present invention (Japanese Patent Application No. 184234/1989) was employed.

The specimens prepared in such manner were subjected to the cooling-storage test mentioned above for one year or more, then the greatest content with no abnormalities found was taken as the maximum allowable content of each Ch.ester, by giving some allowance against the variations thereof due to the impurities contained.

In particular, as for the practical applications of inks, we took into account that a cold season usually lasting 1 to 4 months and a hot summer season too. As the results of such investigations, we have completed the invention of cholesteric liquid crystal compositions comprising a well usability as ink, a long time serviceability even in cold districts, a brilliant coloration, no necessity for microencapsulization, and a color-forming ability at about room temperatures.

The liquid crystal compositions of the present invention are multicomponent mixtures of cholesteryl esters, and usually these cholesteryl esters contain not more than several wt % (hereinafter % stands for wt %) impurities which are impossible to be separated by recrystallization. These impurities preferably have a tendency to retard solid-crystallization, however, care should be exercised, because some of these impurities can worsen the coloration and oxidation resistance of the liquid crystal compositions. Whereas, the esters of cholestanol $3\beta$ is effective, and can be replaced by some of cholesteryl esters.

The liquid crystal compositions of the present invention are characteristic of the multicomponent compositions which are obtained by the combination of various Ch.esters having a variety of molecular constructions and sizes, and the content of each Ch.ester is within its maximum allowable content.

In this invention, with few exceptions, the content of one type of Ch.ester is less than 15% and mostly less than 10%.

Said multicomponent compositions are characterized in that they are made up of by selecting Ch.esters meeting to object and combining them so that the compositions can be generally balanced by the multicomponents and by that each of all Ch.esters compounded restrains and controls the solid-crystallization of other Ch.ester each other (which means that each of all Ch.esters being a component has a content not more than its maximum content) and so that desired color-forming ranges can be obtained.

Illustrative examples for each Ch.ester being necessary for such combinations are as follows:

Examples of Ch.ester (a)(Ch.alkyl carboxylic acid):
Ch.2-methylbutylic acid,
Ch.n-valeric acid,
Ch.isovaleric acid,
Ch.neovaleric acid,
Ch.n-caproic acid,
Ch.isocaproic acid,
Ch.(2-,3-,4-)methylvaleric acid,
Ch.neocaproic acid,
Ch.2,3-dimethylbutylic acid,
Ch.ethylbutylic acid,
Ch.2-ethylbutylic acid,
Ch.diethylacetic acid,
Ch.n-enanthic acid,
Ch.methylcaproic acid,
Ch.(2-,3-,5-)methylcaproic acid,
Ch.(2,2-,2,3-,2,4-,3,3-)dimethylvaleric acid,
Ch.2,2,3-trimethylbutyric acid,
Ch.ethylvaleric acid,
Ch.ethyl isovaleric acid,
Ch.(2-,3-)ethylvaleric acid,
Ch.n-caprylic acid,
Ch.methylenanthic acid,
Ch.(2-,3-)methylenanthic acid,
Ch.(2,2-,2,3-,2,5-,3,4-)dimethylcaproic acid,
Ch.(2,2,3-,2,2,4-,2,3,3-,2,3,4-)trimethylvaleric acid,
Ch.ethylhexanoate,
Ch.(2-,3-)ethylhexanoate,
Ch.3-ethyl-4-methylhexanoate,
Ch.pelargonic acid,
Ch.isononanoic acid, Ch.2,6-dimethyl-4-enanthic acid,
Ch.methylcaprylic acid,
Ch.3,5,5-trimethyl-1-caproic acid,
Ch.ethylenanthic acid,
Ch.(2-,3-)ethylenanthic acid,
Ch.capric acid,
Ch.(2-,3-,6-,7-)methylnonanoic acid,
Ch.isocapric acid,
Ch.ethylcaprylic acid,
Ch.(2-,3-)ethylcaprylic acid,
Ch.ethylnonanoic acid,
Ch.(2-,3-)ethylnonanoic acid,
Ch.undecylic acid,
Ch.ethylcapric acid,
Ch.lauric acid.

Examples of Ch.ester (b)(Ch.alkenyl carboxylic acid):
Ch.ethylcrotonic acid,
Ch.(2-,3-,4-)pentenoic acid,
Ch.tiglic acid,
Ch.angelic acid,
Ch.senecioic acid,
Ch.3-methyl-2-butenoic acid,
Ch.4-methyl-2-pentenoic acid,
Ch.3-ethyl-2-butenoic acid,
Ch.(2-,3-)hexenoic acid,
Ch.α-ethylcrotonic acid,
Ch.(3-,4-)ethyl-2-pentenoic acid,
Ch.(2-,3-,4-,5-,6-)heptenoic acid,
Ch.(2-,3-,7-)octenoic acid,
Ch.2-ethyl-3-hexenoic acid,
Ch.(2-,3-,8-)nonenoic acid,
Ch.2-ethyl-(3-,4-,5-,6-)octenoic acid,
Ch.(2-,3-,4-,8-,9-)decenoic acid,
Ch.citronellic acid,
Ch.geranic acid,
Ch.(2-,10-)undecenoic acid,
Ch.(2-,4-,5-,9-,10-,11-)dodecenoic acid.
Citronell acetic acid,
Ch.(2-,11-,12-)tridecenoic acid,
Ch.(2-,4-,5-)tetradecenoic acid,
Ch.myristoleic acid,
Ch.myristelaidic acid,
Ch.(2-,7-)hexadecanoic acid,
Ch.palmitoleic acid,
Ch.palmitelaidic acid,
Ch.petroselic acid,
Ch.elaidic acid,
Ch.oleic acid,
Ch.(cis-,trans-)vaccenic acid,
Ch.ricinoleic acid,
Ch.ricinoelaidic acid, Examples of Ch.ester (d)(Ch.halo):
Ch.chloride, Ch.bromide.

Examples of Ch.ester (e)(Ch.alkyl carbonate): (hereafter "carbonate" is abbreviated as Cbn)
Ch.n-propyl Cbn,
Ch.isopropyl Cbn,
Ch.n-butyl Cbn,
Ch.isobutyl Cbn,
Ch.2-methylbutyl Cbn,
Ch.n-amyl Cbn,
Ch.neoamyl Cbn,
Ch.active amyl Cbn,
Ch.isoamyl Cbn,
Ch.n-hexyl Cbn,
Ch.isohexyl Cbn,
Ch.(2-,3-,4-)methylamyl Cbn,
Ch.neohexyl Cbn,
Ch.(2-,3-)ethylbutyl Cbn,
Ch.n-heptyl Cbn,
Ch.methylhexyl Cbn,
Ch.(2-,3-,5-)methylhexyl Cbn,
Ch.ethylamyl Cbn,
Ch.(2-,3-)ethylamyl Cbn,
Ch.ethylisoamyl Cbn,
Ch.(2,2-,2,3-,2,4-,3,3-)dimethylamyl Cbn,
Ch.2,2,3-,trimethylbutyl Cbn,
Ch.n-octyl Cbn,
Ch.methylheptyl Cbn,
Ch.(2-,3-)methylheptyl Cbn,
Ch.(2,2-,2,3-,2,5-,3,4-)dimethylhexyl Cbn,
Ch.(2,2,3-,2,2,4-,2,3,3-,2,3,4-)trimethylamyl Cbn,
Ch.ethylhexyl Cbn,
Ch.(2-,3-)ethylhexyl Cbn,
Ch.n-nonyl Cbn,
Ch.isononyl Cbn,
Ch.2,6-dimethyl-4-heptyl Cbn,
Ch.methyloctyl Cbn,
Ch.3,5,5-trimethyl-1-hexyl Cbn,
Ch.ethylheptyl Cbn,
Ch.(2-,3-)ethylheptyl Cbn,
Ch.decyl Cbn,
Ch.isodecyl Cbn,
Ch.(2-,3-,6-,7-)methylnonyl Cbn,
Ch.ethyloctyl Cbn,
Ch.(2-,3-,6-,7-)ethyloctyl Cbn,
Ch.ethylnonyl Cbn,
Ch.undecyl Cbn,
Ch.ethyldecyl Cbn,
Ch.lauryl Cbn,
Ch.tridecyl Cbn,
Ch.myristyl Cbn,
Ch.pentadecyl Cbn,
Ch.palmityl Cbn,
Ch.heptadecyl Cbn,
Ch.stearyl Cbn.

Example of Ch.ester (f)(Ch.alkenyl Cbn):
Ch.allyl Cbn,
Ch.2-ethyl-3-methylallyl Cbn,
Ch.1-propenyl Cbn,
Ch.cis-crotyl Cbn,
Ch.trans-3-butenyl Cbn,
Ch.isobutenyl Cbn,
Ch.(1-,2-)methylallyl Cbn,
Ch.3-ethyl-2-butenyl Cbn,
Ch.(2-,3-,4-)pentenyl Cbn,
Ch.4-methyl-2-pentenyl Cbn,
Ch.(2-,3-)hexenyl Cbn,
Ch.(3-,4-)ethyl-2-pentenyl Cbn,
Ch.(2-,3-,4-,5-,6-)heptenyl Cbn,
Ch.(2-,3-,7-)octenyl Cbn,
Ch.2-ethyl-3-hexenyl Cbn,
Ch.(2-,3-,8-)nonenyl Cbn,
Ch.2-ethyl-(3-,4-,5-,6-)octenyl Cbn,
Ch.geranyl Cbn,
Ch.citronellyl Cbn,
Ch.(2-,3-,4-,8-,9-)decenyl Cbn,
Ch.(2-,10-)undecenyl Cbn,
Ch.(2-,4-,5-,9-,10-,11-)dodecenyl Cbn,
Ch.(2-,11-,12-)tridecenyl Cbn,
Ch.(2-,4-,5-)tetradecenyl Cbn,
Ch.miristoleyl Cbn,
Ch.miristelaidyl Cbn,
Ch.(2-,7-)hexadecenyl Cbn,
Ch palmitoleyl Cbn, Ch.palmitelaidyl Cbn,
Ch.petroselyl Cbn,
Ch.elaidyl Cbn,
Ch.oleyl Cbn,
Ch.(cis-,trans-)vaccenyl Cbn.

Example of Ch.ester (g)(carboxylates and carbonates of aromatic compounds):
Ch.benzoic acid,
Ch.penylacetic acid,
Ch.hydratropic acid,
Ch.($\alpha$-,$\beta$-)phenylpropionate,
Ch.($\alpha$-,$\beta$-,$\gamma$-)phenylbutylic acid,
Ch.(2-,3-,4-,5-)phenylvaleric acid,
Ch.(2-,3-,4-,5-,6-)phenylcaproic acid,
Ch.(2-,3-,4-,5-,6-,7-)phenylenanthic acid,
Ch.cinnamic acid,
Ch.styrylacetic acid,
Ch.(o-,m-,p-)toluic acid,
Ch.(o-,m-,p-)tolylacetic acid,
Ch.(o-,m-,p-)ethylbenzoic acid,
Ch.(o-,m-,p-)propylbenzoic acid,
Ch.(o-,m-,p-)isopropylbenzoic acid,
Ch.(o-,m-,p-high melting point, p-low melting point-)methylcinnamic acid,
Ch.(o-,m-,p-)methoxybenzoic acid,
Ch.(o-,m-,p-)methoxyphenylacetic acid,
Ch.(o-cis,o-trans,m-,p-)methoxycinnamic acid,
Ch.(o-,m-,p-)ethoxybenzoic acid,
Ch.(o-,m-,p-)nitrobenzoic acid,
Ch.(o-,m-,p-)nitrophenylacetic acid,
Ch.(cis-,trans-)(o-,m-,p-)nitrocinnamic acid,
Ch.anthranilic acid,
Ch.(m-,p-)aminobenzoic acid,
Ch.(o-,m-,p-)aminophenylacetic acid,
Ch.(o-,m-cis,m-trans,p-cis,p-trans)aminocinnamic acid,
Ch.hydrogen (o-,m-,p-)phthalate,
Ch.(o-,m-,p-)chlorobenzoic acid,
Ch.(o-,m-,p-)chlorocinnamic acid,
Ch.(o-,m-,p-)carboxyphenylacetic acid,
Ch.(2,3-,2,4-,2,5-,2,6-,3,4-,3,5-)dimethylcinnamic acid,
Ch.homoveratric acid,
Ch.homoanthranilic acid,
Ch.hydrogen nitroterephthalate,
Ch.hydrogen (3-,4-)nitrophthalate,
Ch.hydrogen (2-,4-,5-)nitroisophthalate,
Ch.hydrogen aminoterephthalate,
Ch.hydrogen (3-,4-)amino phthalate,
Ch.hydrogen (2-,4-,5-)amino isophthalate,
Ch.(2,3-,2,4-,2,5-,2,6-,3,4-,3,5-)dinitrobenzoic acid,
Ch.(2,3-,2,5-,3,4-,3,5-)diaminobenzoic acid,
Ch.(2,3-,3,4-)dimethoxybenzoic acid,
Ch.(2,3-,2,4-,2,5-,2,6-,3,4-,3,5-)dichlorobenzoic acid,
Ch.hydrogen (3,4-,4,5-)dimethoxy phthalate,
Ch.hydrogen 4,5-dimethoxy isophthalate,
Ch.phenyl Cbn,
Ch.(o-,m-,p-)methylphenyl Cbn,
Ch.(o-,m-,p-)ethylphenyl Cbn,
Ch.(o-,m-,p-)methoxyphenyl Cbn,
Ch.(o-,m-,p-)aminophenyl Cbn,
Ch.(o-,m-,p-($\alpha$-,p-$\beta$-)nitrophenyl Cbn,
Ch.(o-,m-,p-)chlorophenyl Cbn,
Ch.(3,5-,2,3-,2,4-,2,5-,2,6-,3,4-)dimethylphenyl Cbn,
Ch.(2,3-,2,4-,2,5-,2,6-,3,4-,3,5-)dinitrophenyl Cbn,
Ch.(2,3-,2,4-,2,5-,2,6-,3,5-,3,6-)diaminophenyl Cbn,
Ch.(2,3-,2,4-,2,5-,2,6-,3,5-,3,6-)dichlorophenyl Cbn,
Ch.benzyl Cbn,
Ch.($\alpha$-,$\beta$-)phenylethyl Cbn,
Ch.$\alpha$-phenylallyl Cbn,
Ch.cinnamyl Cbn,
Ch.($\alpha$-,$\beta$-,$\gamma$-)phenylpropyl Cbn,
Ch.(1-,2-,3-,4-)phenylbutyl Cbn,
Ch.(1-,2-,3-,4-,5-)phenylamyl Cbn,
Ch.(1-,2-,3-,4-,5-,6-)phenylhexyl Cbn.
Ch.(o-,m-,p-)xylyl Cbn,
Ch.(o-,m-)methoxybenzyl Cbn,
Ch.anise Cbn,
Ch.(o-,m-,p-)aminobenzyl Cbn,
Ch.(o-,m-,p-)nitrobenzyl Cbn,
Ch.(o-,m-,p-)carboxybenzyl Cbn,
Ch.(o-,m-,p-)chlorobenzyl Cbn,
Ch.(2,3-,3,4-)veratryl Cbn.

Examples of Ch.ester (h)(carboxylates and carbonates of carbon 4- to 7-member of alicyclic compounds):
Ch.cyclobtanecarboxyilc acid,
Ch.cyclopentanecarboxylic acid,
Ch.hexahydrobenzoic acid,
Ch.cyclohexylacetic acid,
Ch.suberane carboxylic acid,
Ch.laurolanic acid,
Ch.(o-cis-,o-trans-,m-dl-,m-1-,p-cis-,p-trans)hexahydrotoluic acid,
Ch.butylhydrobenzyl Cbn,
Ch.cyclopentyl Cbn,
Ch.hexahydrobenzyl Cbn,
Ch.heptylhydrobenzyl Cbn,
Ch.cyclobutyl Cbn, Examples of Ch.ester (i)(monoesters which are hydrogen dicarboxylate of 4- to 7-member of alicyclic compounds):
Ch.hydrogen cyclobutan-1,1-dicarboxylate,
Ch.hydrogen (cis-,trans-)cyclobutane (-1,2-,-1,3-) dicarboxylate,
Ch.hydrogen cyclopentane-1,1-dicarboxylate,
Ch.hydrogen (cis-,trans-)cyclopentane(-1,2-,-1,3-) dicarboxylate,
Ch.hydrogen (cis-,trans-)cyclohexane(-1,2-,-1,3-,-1,4-) dicarboxylate.

In the following, some of important Ch.esters are selected from the illustrative examples mentioned above over wide ranges and the selected Ch.esters are grouped by their principal functions on convenience (each esters selected is allowed to be alloted to one of the groups), and the maximum allowable content of each Ch.ester is shown in Table 1 according to said functions in the case when said ester is compounded into a mixture containing 42% Ch.pelargonic acid, 14.0% lauryl carbonate and 11.0% Ch.benzoic acid (excepting that the case wherein Ch.oleyl carbonate or Ch.chloride is compounded) being one of the basic mixing forms of the embodiments in this invention. By these reasons, as for the Ch.esters used in the present invention, when their molecular structures, molecular weight values and melting points are similar, except for some esters used much, their maximum allowable contents have little difference in them with some exceptions; therefore, the estimation of the maximum allowable contents of the Ch.esters other than those shown in Table 1 is made possible with relatively small errors. In addition, as for some of said Ch.esters which will decrease in serviceability with the increase of loading resulting in weakened their color-forming performance as well as decreased color-forming temperature not necessarily solid-crystallization, their contents considered to be serviceable limits are defined as the maximum allowable contents thereof.

TABLE 1

| Name (Group Number) | Allowable content % | Clarity | Color-forming range | Adaptability |
|---|---|---|---|---|
| *Chief Agent* | | | | |
| Ch.pelargonic acid (I) | 45.0 | (+) | rise (great) | 5 |
| Ch.lauryl carbonate (II) | 15.5 | (+) | H* (drop) little L** (rise) great | 5 |
| Ch.benzoic acid (III) | 11.5 | (+)(+) | (drop) a little small | 5 |
| Ch.oleyl carbonate (II) | 80.0 | H* (−) L** (+) | H (drop) great L (rise) a little small | 4 |
| *Auxiliary Agent* | | | | |
| Ch.n-caproic acid (I) | 9.5 | (0) | (drop) small | 5 |
| Ch.n-butyl carbonate (II) | 13.0 | (0) | (drop) medium | 5 |
| Ch.n-heptyl carbonate (II) | 5.0 | (+) | (drop) small | 5 |
| Ch.hydrocinnamyl carbonate (III) | 6.0 | (0) | (drop) small | 5 |
| Ch.hexahydrobenzyl carbonate (III) | 7.0 | (0) | (drop) a little small | 5 |
| Ch.benzyl carbonate (III) | 10.0 | (0) | (drop) a little small | 5 |
| Ch.β-phenylpropionate (III) | 5.0 | (+) | (drop) medium | 5 |
| Ch.3,5,5-trimethyl-1-hexyl carbonate (II) | 5.0 | (0) | (drop) medium | 4 |
| Ch.n-hexyl carbonate (II) | 3.0 | (0) | (drop) small | 4 |
| Ch.n-amyl carbonate (II) | 4.5 | (0) | (drop) medium | 4 |
| Ch.2,6-dimethyl-4-heptyl carbonate (II) | 5.0 | (0) | (drop) medium | 4 |
| Ch.p-xylyl carbonate (III) | 5.0 | (0) | (drop) small | 4 |
| Ch.p-toluic acid (III) | 5.0 | (−) | (drop) small | 4 |
| Ch.p-ethylbenzoic acid (III) | 4.5 | (−) | (drop) small | 4 |
| Ch.p-propylbenzoic acid (III) | 4.0 | (−) | (drop) small | 4 |
| Ch.m-methoxybenzyl carbonate (III) | 4.5 | (0) | (drop) small | 4 |
| Ch.anise carbonate (III) | 4.5 | (0) | (drop) small | 4 |
| Ch.cyclopentyl carbonate (III) | 5.5 | (0) | (drop) small | 4 |
| Ch.cyclohexylacetic acid (III) | 4.5 | (−) | (drop) medium | 4 |
| Ch.0-hexahydrobenzoic acid (III) | 4.5 | (0) | (drop) a little small | 4 |
| Ch.hexahydro(cis)toluic acid (III) | 4.5 | (−) | (drop) medium | 4 |
| Ch.2-pentenyl carbonate (II) | 5.0 | (0) | (drop) medium | 3 |
| Ch.2-hexenyl carbonate (II) | 4.5 | (0) | (drop) small | 3 |
| Ch.3-heptenyl carbonate (II) | 4.5 | (0) | (drop) small | 3 |
| Ch.styrylacetic acid (III) | 4.0 | (−) | (drop) medium | 3 |
| Ch.cinnamyl carbonate (III) | 6.0 | (−) | (drop) small | 3 |
| Ch.p-nitrobenzyl carbonate (III) | 5.0 | (0) | (drop) small | 3 |
| Ch.oleic acid (I) | 4.5 | (0) | (H) drop medium (L) rise | 3 |
| *Color-forming Range Adjusting Agent* | | | | |
| Ch.lauric acid (I) | 5.0 | (+)(+) | (rise) great | 5 |
| Ch.phenylacetic acid (III) | 9.5 | (−) | (drop) medium | 5 |
| Ch.(cis)crotyl carbonate (II) | 5.0 | (0) | (drop) medium | 5 |
| Ch.allyl carbonate (II) | 4.5 | (0) | (drop) a little great | 5 |
| Ch.active amyl carbonate (II) | 4.5 | (0) | (drop) a little great | 5 |
| Ch.neoamyl carbonate (II) | 4.5 | (0) | (drop) medium | 5 |
| Ch.isoamyl carbonate (II) | 4.5 | (0) | (drop) a little great | 5 |
| Ch.p-tolylacetic acid (III) | 4.5 | (−) | (drop) a little great | 4 |
| Ch.cyclobutyl carbonate (III) | 4.5 | (0) | (drop) medium | 4 |
| Ch.cyclopentanecarboxylic acid (III) | 4.5 | (−) | (drop) medium | 4 |
| Ch.suberanecarboxylic acid (III) | 4.5 | (−) | (drop) medium | 4 |
| Ch.p-methylcinnamic acid (III) | 4.5 | (−) | (drop) a little great | 3 |
| Ch.3-ethyl-2-pentenoic acid (I) | 5.0 | (−) | (drop) a little great | 3 |
| Ch.hydratropic acid (III) | 5.0 | (−) | (drop) a little great | 3 |
| Ch.2-ethyl-3-octenyl carbonate (II) | 4.5 | (−) | (drop) medium | 3 |
| Ch.-p-methoxybenzoic acid (III) | 4.5 | (−) | (drop) a little great | 3 |
| Ch.p-ethoxybenzoic acid (III) | 4.5 | (−) | (drop) a little great | 3 |
| Ch.p-nitrobenzoic acid (III) | 5.0 | (−) | (drop) a little great | 3 |
| Ch.p-aminobenzoic acid (III) | 5.0 | (−) | (drop) medium | 3 |
| Ch.cyclobutanecarboxylic acid (III) | 5.0 | (−) | (drop) a little great | 3 |
| Ch.10-dodecenyl carbonate (II) | 4.0 | (−) | (H) drop a little small (L) rise | 3 |
| Ch.-2-ethyl-3-hexenoic acid (I) | 4.5 | (−) | (H) drop a little small | 3 |

TABLE 1-continued

| Name (Group Number) | Allowable content % | Clarity | Color-forming range | Adaptability |
|---|---|---|---|---|
| Ch.laurolanic acid (II) | 4.0 | (−) | (L) rise (H) drop a little small | 3 |
| Ch.n-octyl carbonate (II) | 3.0 | (+) | (L) rise (H) drop small | 3 |
| Ch.n-nonyl carbonate (II) | 3.0 | (+)(+) | (L) drop (rise) great | 3 |
| Ch.undecyl carbonate (II) | 3.5 | (+) | (H) drop a little small | 3 |
| Ch.tridecyl carbonate (II) | 3.5 | (+) | (L) drop (H) drop a little small (L) drop | 3 |
| Ch.anthranilic acid (III) | 3.5 | (−) | (drop) a little great | 3 |
| *Anti-solid-crystallizing Agent* | | | | |
| Ch.hydrogen terephthalate (III) | 9.0 | (−)(−) | (drop) great | 5 |
| Ch.2-ethylhexanoate (I) | 20.0 | (−) | (drop) small | 5 |
| Ch.2-ethylbutyl carbonate (II) | 7.0 | (−) | (drop) medium | 5 |
| Ch.isobutyl carbonate (II) | 6.0 | (−) | (drop) a little great | 5 |
| Ch.2-ethylhexyl carbonate (II) | 8.0 | (−) | (drop) small | 5 |
| Ch.3,5-dinitrobenzoic acid (III) | 4.5 | (−)(−) | (drop) great | 4 |
| Ch.3,5-diaminobenzoic acid (III) | 4.5 | (−)(−) | (drop) great | 4 |
| Ch.hydrogen cyclopentane-1,3-dicarboxylate (III) | 4.5 | (−)(−) | (drop) a little great | 4 |
| Ch.hydrogen hexahydro(cis) terephthalate (III) | 4.5 | (−)(−) | (great) a little great | 4 |
| Ch.isopropyl carbonate (II) | 4.5 | (−) | (drop) great | 3 |
| Ch.citronellacetic acid (I) | 4.5 | (−) | (drop) small | 3 |
| Ch.citronellyl carbonate (II) | 4.5 | (−) | (drop) a little small | 3 |
| *Examples of Specific-use Agent* | | | | |
| Ch.chloride (I) | 20.0 | (+) | (drop) great | 4 |
| Ch.3-chloropropionate (I) | 9.0 | (+) | (drop) great | 4 |
| Ch.p-chlorocinnamic acid (III) | 8.0 | (+) | (drop) a little great | 4 |
| Ch.3,5-dichlorophenyl carbonate (III) | 5.0 | (−) | (drop) a little great | 4 |
| Ch.3,5-dichlorobenzoi·acid (III) | 3.5 | (−) | (drop) a little great | 4 |
| Ch.bromide (I) | 5.0 | (−) | (drop) great | 4 |
| Ch.cinnamic acid (III) | 8.0 | (+) | (drop) medium | 4 |

*H: high temperature side
**L: low temperature side

The maximum allowable content of each Ch.ester will vary according to the compositions of other Ch.esters, however, composition-variation within the degree which can be directly estimated from the above examples has small variation range; therefore, each value of said maximum allowable contents can be employed, but with no Ch.oleyl carbonate or Ch.chloride incorporated.

The functions and features of said chief agents, auxiliary agents, color-forming range moderating agents, anti-solid-crystallizing agents and specific-use agents are as follows:

Chief agent: A chief agent has a maximum allowable content and forms color by itself, and plays a principal role in determining color-forming range. Then, the chief agents have usually greatest amount of mixing. Nevertheless, it is impossible to allow the sum of the maximum allowable contents of Ch.esters to be 100% only by chief agents.

Auxiliary agents: An auxiliary agent neither forms color by itself nor the addition thereof to a composition makes color-forming improved. However, it does not inhibit color-forming significantly at a mixture as well as lower other maximum allowable contents, nevertheless, since it has great maximum allowable content despite its little effect for dropping color-forming temperature, it can relatively decrease the contents of other Ch.esters to be mixed and, as a result, is important for forming a stable mixture. Many types of auxiliary agents, however, when each of their contents becomes more than about 6%, will make their color-formation thinner because of their no color-forming characteristics.

Color-forming range adjusting agent: This agent is more effective in lowering color-forming temperature than an auxiliary agent for the same amount of mixture, and it will provide said mixture with a desired color-forming range by the simultaneous use of the auxiliary agent.

Including Ch.esters used for other objects, generally, with the lowering of color-forming temperatures, corresponding color-forming ranges will be enlarged (as for Ch.oleyl carbonate, as it has specific properties, illustration will be separately given by an example).

Anti-solid-crystallizing agent: This type agent is important in an environment wherein low temperatures (about not more than 5° C.) continue for at least one month is expected; and is effective in lowering the temperature of operations and annealing.

A Ch.ester having an ethyl group as a side chain is relatively effective in supercooling property, allows a mixture system to be brought near a glass-like state, with the viscosity of the mixture increased; whereby low temperature solid-crystallization of the mixture will be prevented (as for the present agent, it will be illustrated together with Ch.oleyl carbonate in an example). In addition, when a low temperature-storage of a mixed liquid crystal, which forms color at 30° C. or more, is expected, combination use with other anti-solid-crystallizing agent is desirable. In addition, monoesters of cyclic Ch.dicarboxylic acid, etc. used for this object have a great solid-crystallization preventing effect in spite of their small contents at the vicinity of the maximum allowable contents thereof, and increase the maximum allowable contents of other mixed ester, however, since said monoesters have a negative effect for worsening color-formation, they can not be used much.

Examples of specific-use agent:

Generally, there is no need for this agent to be used, however, in particular case it is employed, for example, for the adjustment of color-forming ranges by using its property being easily sensitive to ultraviolet rays, etc. As for Ch.methylcinnamic acid, it will be particularly explained in an example. It can be also used when larger color-forming ranges at relative low or high temperatures are required.

Further, in Table 1, properties described below in addition to maximum allowable contents are shown in addition.

Clarity-change: This property represents the influence given by mixtures prepared by the esters at their maximum allowable contents on the clarity of color-formation, but when maximum allowable contents are great and mixtures having contents at the vicinity of said great contents are not used, influence at the contents usually mostly used is shown. The influence were evaluated according to the following 5 steps; (+)(+): making color-forming clarity good, (+): making a little good, (0): giving no influence, (-): making color-forming clarity a little poor and (-)(-): making worse.

Degree of change of color-forming temperature range:

Said degree of change when an identical amount of said moderating agent was added was shown by the comparison with other cholesteryl esters. The evaluation results were represented by the following five steps of great, a little great, medium, a little small and small; besides, the moderating agents increasing the color-forming temperature are shown by (rise), and decreasing shown by (drop). In addition, as for said agent decreasing the temperature when the color-forming temperature was high also as for increasing the temperature when the color-forming temperature was low, the evaluation results at both cases of the high and the low color-forming temperatures were written.

Adaptability rank on the effects given to stability, color-forming property, temperature characteristics, resistance to oxydation and to ultraviolet rays and processing and operation characteristics, etc., overall adaptabilities at general conditions when the present invention was conducted were evaluated according to the following five ranks, such as 5 is best and 1 is worst. And as for 1 and 2, they are not so important that such ranks are not shown in Table 1.

Nevertheless, as for specific-use agents, evaluations thereof are determined by their properties or functions to which importance is given; therefore, the agents can be principal or essential components.

In Table 1, an agent having double bond is generally given poor evaluation, because they have less resistance to oxydation compared with the saturated agents. However, they can be important cholesterile esters depending on usages or applications thereof.

As another agent, antioxidant being conventionally used in this field can be incorporated into the liquid crystal compositions of the present invention.

For satisfactory anti-oxidizing effects, a mesomorphic substance like a liquid crystal composition used in the present invention requires much more amount of antioxidant than that in conventional viscous liquids. Use of less than 0.5% antioxidant is insufficient, usually, 0.5%-1.0% antioxidant is employed. If 1.0% or more than 1.0% used, worsening of color-formation becomes remarkable. As far as mildewproofing agents such as used in conventional liquid crystal compositions are concerned, they are not necessary to be used for the liquid crystal compositions of the present invention, because considerable amount of benzoic acid known as a mildewproofing agent is incorporated therein.

In the following, color-forming liquid crystal composite products will be illustrated which are prepared by the complex use of liquid crystal compositions mentioned above and transparent high molecular materials. Said composite products, specifically, are molded composite products such as liquid crystal film and liquid crystal fiber, and composite liquid compositions such as liquid crystal coating and liquid crystal ink. These color-forming liquid crystal composite products have been found to be stable for long periods without imparting effect on said liquid crystal compositions.

The present invention provides two types of liquid crystal films, and one of which comprises a liquid crystal composition mentioned above sandwiched between a base board and a transparent protecting film. As the base board, a black plastic film is preferred, and as the material for the transparent protecting film, non-solvent type electromagnetic radiation curing resin is preferred. As for a method of preparing this type of liquid crystal film, as will be described later a method of protecting liquid crystals according to the present invention is advantageous.

And another type of liquid crystal film composed of a mixture of said liquid crystal composition and said transparent high molecular substance (a liquid crystal fiber is also composed of a mixture of said liquid crystal composition and said transparent high molecular substance), and said film is obtained by extrusion of a liquid prepared by dissolving or dispersing said mixture in a suitable solvent by means of a conventional method into a film, (or into the form of fiber in case of a liquid crystal fiber) and then by drying thereof. As for high molecular substance to be used, usually, celluloses, acrylate resins, modified melamine resins, polyvinyl alcohols, butyral resin, polyvinyl chloride, polyvinylidene chloride, polystyrene, polyesters, butyral resin gelatin, etc. are employed. The liquid crystal composition to high molecular substance ratio with respect to a liquid crystal film as well as to a liquid crystal fiber is preferably about 1:(2-7) by weight. It is also preferred practice that the protection and/or reinforcement of the surface of such obtained liquid crystal film or an easier distinction of a color-formation, the lamination of transparent plastic films to said liquid crystal film at its both sides, or the lamination of a black plastic film and a transparent plastic film thereto at its one and another surfaces respectively. In addition, as for liquid crystal fiber; for the same purposes, it is preferable that the surfaces of said liquid crystal fiber are covered (or wrapped) with transparent high molecular substance, and intertwined with transparent high molecular fiber to make composite fiber or thread. Further, for an enlarged color-formation, plural kinds of liquid crystal films having different color-forming ranges each can be preferably laminated.

In addition, when said liquid crystal compositions are used as liquid crystal fluids, that is, as liquid crystal coatings or liquid crystal inks, the compositions are used together with transparent high molecular substances mentioned above, with the both of which dissolved or dispersed in suitable solvents.

The coatings and inks have similar formulations, and some of the coatings having adaptability for printing applicable for are printing inks. As to printings using liquid crystals, they are not commonly serviceable because their poor color-forming clarity due to the extremely thin thickness of ink and their uneven spreading. And the liquid crystal composition to the high molecular substance ratio, in each case, is suitably 1:(2-7).

In the following, a method of protecting liquid crystals is illustrated. In this method, a base board having liquid crystal patterns printed or pictured is used, and the thickness of the liquid crystal pictures are usually from 10 to 20 microns.

The present invention is directed to a method for the formation of a protecting film which comprises coating the liquid crystal patterns including their peripheries on said base board with a non solvent type liquid electromagnetic radiation curing resin with a thickness being usually at least twice at thick as those of the liquid crystal patterns; during or just after said coating operation, within a time prior to the occurrence of damaged film such as pinholes, craters and broken film, irradiating the resin film with irradiation or strong ultraviolet ray being suitable for immediate curing to obtain a transparent and strong film adhered to said base board.

The thickness of protecting film is the remainder obtained by the substraction of the liquid crystal thicknesses from the coating thickness, resulting in the protecting film surface being even. The liquid crystals protected with a protecting film are not particularly limited, however, the liquid crystals compositions mentioned above according to the present invention are preferable.

An embodiment of the present invention will be illustrated.

The liquid crystal patterns have a high viscous liquid surface, and the coating resin to be used is likewise a viscous liquid before curing.

The liquid crystal patterns in this case are a extremely thin flat film and are under the influence of the adhesion between a base board and said patterns when the patterns closely adhered to the base board, in addition the patterns sag spontaneously at their edge and corner, along with by the surface tension thereof, to form a rounding surface tension shape; therefore, resistance against coating is decreased to have little distortion of patterns.

In addition, coating is usually conducted by a knife coater, during which the viscosity of a resin is temporarily decreased by a strong shear stress. Therefore, the resin to be used will be selected from the conventional resins having medium-viscosity. Fearing the distortion of the patterns, if too low viscosity is employed, the liquid crystal will reject the resin owing to the effect of surface tension thereof, allowing the film to have craters, or a mixing between some amount of resin and liquid crystals will take place resulting in cloudiness during color-formation. Such troubles are closely related to with time lag, so that if the film can be cured prior to the occurrence of the craters or the generation of the cause of the cloudiness, no damaged film will be produced.

Accordingly, in the practice of the present invention, greatest attention should be given to a method of shortening the time lag between coating and curing, and the shorter time lag, the better protecting film will be easily obtained.

Thickening a film thickness is commonly considered for a better quality of film through restraining the occurrence of pinholes and craters therein. For the achievement of these conditions, irradiation dose per unit surface area of the resin should be increased, however, which will rise the temperature of the irradiated material (especially in the case of ultraviolet ray irradiation) leading to a lowered viscosity of the resin just before the curing thereof only to have the film easily damaged.

Most amount of irradiation is absorbed by the resin for the curing thereof, however, generally some amount of irradiation reaches the liquid crystal to be not a little subjected to the effect thereof generally.

Therefore, a preferred coated film thickness is at least 3 times as thick as that of the liquid crystal pattern (the film thickness on the liquid crystal pattern is twice as thick as that of the liquid crystal pattern) that is, from 30 to 120 microns, usually from 35 to 100 microns.

In the following, other exemplary method according to the present invention will be illustrated. This method is effective in the following cases: when coating of a liquid resin and curing thereof can not continually and simultaneously conducted in one unit process with no time interval between said both processes on some reasons; but with at least 2 seconds of inevitable interval; when a thinner thickness of protecting film is required; and when a protecting film for a curved surface is required.

Without coating a liquid resin directly to a liquid crystal pattern, it is possible to obtain a protecting film being transparent solid, by coating the liquid resin in a desired thickness on a non-adhesive (easily adhesive) plastic film having a high irradiation-permeability and on moisture-absorbing cellophane; facing the surfaces of said liquid resin and liquid crystal pattern laminated each other; then irradiating a back film at the back surface to make the protecting resin cured; peeling mildly the non-adhesive film as such or peeling it after heating (as for the easily adhesive film, it is left laminated in spite of the increasement of thickness due to the film); and peeling the moisture-absorbing cellophane having moisture allowed to be well absorbed at the back surface.

Thus, in the case of the coating agent having back film, since the laminated liquid resin can not be rejected owing to the difference in surface tension between the resin and the liquid crystal pattern, no craters and broken films will occur at the surface of the coating. However, the film having the liquid resin coated must be laminated to a base board having a liquid crystal picture so as to have no bubbles and distortioned pattern by taking suitable measures to meet each of said problems.

In addition, after the lamination, the shorter time till the irradiation the more preferable, and the time is limited to one minute, preferable up to half minute.

Further, an intermediate method of said two embodiments will be illustrated.

Here, the resin is directly coated on a base board having liquid pattern by a doctor knife. In this case, a back film fixed at the one end thereof is applied between the liquid resin to be coated and the doctor knife, then the surface of the back film is squeezed by the doctor knife without being wet with the resin. At this time, if the liquid resin is placed on the back board, the resin will be spread uniformly in a constant thickness by squeegee pressure with the back film adhered, then the resulting material is cured according to said manner to obtain protecting film.

In the following, the color-forming liquid crystal picture laminated product of the present invention will be described.

This laminated product has liquid crystals of different color-forming temperatures, and each of which is printed or pictured on each corresponding transparent protecting film. The preparing method, for example, is as follows. First, a pattern comprising some type of liquid crystal is printed or pictured on a transparent film to be used as a base board, thereon is formed a protecting film according to a method mentioned above, further thereon is printed or pictured a pattern comprising another type of liquid crystal, again thereon is formed a protecting film, and then each of these processes is repeated to obtain a desired number of lamination. In addition, if necessary, on the last protecting film is applied an additional transparent film. As another method, each of patterns comprising different types of liquid crystals each is printed or pictured on each of a desired number of transparent films, in addition thereon is formed a protecting film according to the method described above, then these transparent films having the patterns and protecting films are laminated together so that the transparent films are overlapped on the protecting films. And as for the transparent films used in the later method, they are as thin as possible are desirable. Also in any above method, the bottom layer of transparent film, which is used as the base boards for the film laminated product, is preferably to be colored black (painting the opposite side surface of a protecting film with a black paint, or laminating a black sheet such as a pressure-sensitive adhesive sheet is permissible) so that the color-forming pattern of each layer can be easily seen by the absorption of transmitted light. In addition, in this film laminated product, it is preferable to select the color-forming range of liquid crystal pattern of each layer, so that the moment when a liquid crystal pattern under color-formation begins to exceed the color-forming range of the liquid crystal due to temperature change, the adjacent upper or lower layer of liquid crystal pattern begins to develop color-formation. Further, as for a transparent film, it is preferable for the film to have ultraviolet-protecting and/or gas barriering properties.

According to such manners as stated above, as for thermographics, etc. used for heat distribution image display, they have a wider color-forming range and allow high sensitive display, also, as for thermometer, etc., they permit easily visible displays even in a smaller space by the use of a larger size of digital display. In addition, since the color-forming patterns visible from the surface can be changed variably through temperature-change; therefore, the development of a novel field of graphic design having temperature sensitive properties will be possibly realized.

As for the color-forming liquid crystal picture laminated product according to the present invention, there are also fiber-like laminated products other than the film-like laminated products stated above. Said fiber-like laminated products are produced as follows. First, endless length of several tens to several hundreds of lines having a desired width are printed as liquid crystal image at a constant spacing parallel and endlessly by means of principally a rotary screen or gravure printing onto a continuous film wound around a reel, then, on the resulting film is formed a protecting film, and such processes are repeated as in the case of the preparation of said film-like laminated product to produce a continuous laminated film having many printed line images of liquid crystals having different color-forming temperatures each layer. And thereon is laminated a transparent film (as in the case of the film-like laminated products, it is preferable for this transparent film to have ultraviolet-protecting and/or gas barriering properties). Such obtained laminated films, according to conventional methods for preparing gold and silver threads, are slitted by a slitter as well as are wound to obtain liquid crystal laminated threads. When such liquid crystal laminated threads are produced, a printing and cutting-thread making techniques having a high precision are required so that the liquid crystal linear patterns to be laminated may not have a shear in width directions, and so that the edges of the slitter will touch the liquid crystal linear patterns at their side protection walls. The liquid crystal threads prepared carefully according to the present invention are possible to make them into clothes according to the quite same method as in making clothes using gold and silver threads, and the liquid crystal cloths have similar degree of mechanical strength as conventional ones, their color-formation changes brilliantly with a high sensitivity and a wider color-forming range over a long period; therefore, a novel and extremely useful effective material can be provided for interior upholsteries, dress accessories design.

The effects according to the present invention are as follows:

(1) According to the present invention, color-forming liquid crystal compositions of steroid family can be obtained which need no microencapsulization: have any color-forming range within the range between $-5°$ C. and $45°$ C.; are stable for a long time of storage and use; and are brilliantly color-forming. Since said liquid crystals undergo not only color-formation due to temperature change but also sensitive color-formation due to displacement and differential pressure, they can be employed for the detection of differential pressure, vibration, material fatigue, etc.

Said liquid crystals can be used for printing with no solvent in an atmosphere of not less than 40° C., or with 10–20% solvents mixed at normal temperatures (silk screening printing is most suitable) as well as are suitable for the picturing with a writing brush and the coating with a brush under the conditions similar to printing conditions including the requirements for solvent and temperature.

Using a spraygun capable of being heated, spray coating can be applied to a object being at normal temperatures thinly, evenly and over a larger area thereon using a heated coating diluted with solvent.

(2) Hitherto, liquid crystals microencapsulized having an arbitrarily color-forming range near room temperature are dispersed directly in a high molecular binder, etc. for using them as coatings, printing inks and fibers, however, since the size of dispersed particles thereof varies extremely, the most of the particles can not have the advantages as fine particles obtained when microencapsulized and have become solid-crystallized resulting in practical disuse. On the contrary, the liquid crystal compositions according to the present invention will not solid-crystallize in spite of their size and shape; therefore, without impairing their characteristic effects (liquid fine particles are unable to pass into solid-crystallized state even at below the freezing temperature obtained by the complex use with a transparent high molecular substance, can provide practically useful products, having excellent effects, such as liquid crystal film, liquid crystal ink, liquid crystal pigment, liquid crystal coating, liquid crystal fiber, etc. having an arbitrary color-forming range near temperatures, and being in the form of unencapsulized direct, vehicle dispersion and solid matrix dispersion.

Further, all the liquid crystal compositions according to the present invention can be microencapsulized.

And some liquid crystal compositions of the present invention can contain compositions being sufficiently practically available not only as thermo effective type of liquid crystals but also as electric field effective type of liquid crystals, and they can be clearly controlled of their color-formation.

(3) According to the method for protecting liquid crystals of the present invention, in the cases of liquid crystal printing and picturing, since microencapsulization has become unnecessary by the combination use with coloring preservation liquid crystals (including chiral pneumatic type), complex and precise patterns, and even fine line patterns, which are given only by screen printing, etc. having at least 500-mesh screen, can be freely printed, together with unnecessarily thick printing patterns can be desirably excluded. Also, ink this method, since no binders and capsule crusts are used, no irregular reflections and discoloration will occur; while, under color-formation extremely brilliant color-formation is extremely brilliant color-formation is developed to increase decorative value; and under not color-formation, excellent transparency is obtained by the help of thin thickness of pictures.

In addition, the practice of the method of the present invention makes microencapsulization process, sieving process, binder dispersing process, etc. in conventional methods unnecessary; therefore, said method makes its economic effect large enough.

The method of the present invention is not limited to liquid crystals, but is most suitably applicable, as it is, for obtaining protecting films for thin-gauge film patterns of other viscous liquids such as grease-like substance, magnetic fluid, conductive non-dry fluid, etc.

(4) As for the color-forming liquid crystal picture laminated products of the present invention, the color-formation changes over the visible ray full range corresponding to temperature change, and if the product exceeds a preset limited value, another picture begins to form color in place of the picture which has been coloring. In this manner, a few pictures being different each other depending on temperature change can be clearly seen visually. Accordingly, fabrics such as threads and cloths, and thermographics for heat distribution image display can be manufactured having a high sensitivity and a wide range of color-formation. As for thermometers, etc. since their temperature display digits are all superposed, even a small space can display large size of digitals allowing them to be easily readable, and if patterns are printed together with digitals of temperature, a novel designing effect can be obtained. Each of short sentences, marks, etc. which are different from each other can be displayed on a same plane according to its own specified temperature. The laminated products of the present invention are available for from a small one such as dress accessories to a product having large area of surface such as wall face, curtain, etc. These laminated products change their color-formation and visual pictures according to environmental temperature change, also allow the colors and patterns thereof generated by selective scattered light to be visible with variations depending on the angles to look at them, thereby, the products can provide more novel visual effects. Consequently, the laminated products of the present invention are possible to provide new materials to permit the development of a novel sensitivity of graphic design, interior upholsteries design, dress accessories design.

In particular, when using the liquid crystal compositions, the resulting liquid crystal picture laminated products given excellent results comprising no necessity of microencapsulization, arbitrary color-forming range, and stability for a long time, and long term preservation-using ability.

DESCRIPTION OF THE PREFERRED EMBODIMENTS

The present invention will be described in more details with reference the following embodiments.

EMBODIMENTS OF LIQUID CRYSTAL COMPOSITION

The liquid crystal component of the present invention is a multicomponent mixed liquid crystals of different types, shape and size esters composed of said groups I, II and III; and the formulation content of each component is not more than the maximum allowable content shown in Table 1. As for antioxidants, as a result of investigations, a mixture of 25.0% p-methoxyphenol, 50.0% 2,6-di-tert-butyl-p-cresol, 15.0% 3,3'-thiodipropionic acid-di-n-octadecyl ester, 10% 3,3'-thiodipropionic acid-n-dodecyl ester was used.

In formulation 1-(A) of Example 1, when in place of 0.5% antioxidant, 0.5% Ch.n-butyl carbonate is added, the color-forming temperature thereof rises by 1° C., and if the amount of antioxidant is nothing and 1.0% Ch.n-butyl carbonate is added, said temperature rises by 2° C.

Besides, even in the case only color-forming ranges are shown in the Examples, the lower temperature is that at which a first appearance of red color-formation and the higher is that at which dark violet coloration develops and at the temperatures between the both temperatures, color-formation changes covering all the visible ray range corresponding to environmental temperatures.

Example 1

Formulation 1-(A): which comprises 45.0% Ch.pelargonic acid, 14.5% Ch.lauryl carbonate, 11.5% Ch.benzoic acid, 9.0% Ch.n-caproic acid, 5.0% Ch.n-heptyl carbonate, 4.0% Ch.lauric acid, 7.0% Ch.2-ethylhexanoate, 3.0%, Ch.hydrogen terephthalate, and 1.0% antioxidant. As a result, a liquid crystal composition can be obtained which comprises clear color-formations, the first appearance of red color at 31° C., dark red at 32° C., orange at 33° C., green at 34° C., blue at 35° C., violet at 36° C. and dark violet at 37° C.

Said measurements are obtained after an elapse of two months since the application of printing and protecting film according to the similar conditions as those in said maximum allowable contents were determined (hereinafter, similar measuring conditions will be applied).

1-(B): In the formulation of 1-(A), the contents of Ch.n-caproic acid and Ch.hydrogen terephthalate are reduced to 6.0% and 2.5% respectively, while Ch.2-ethyl hexanoate is increased to 10.5%, and a liquid crystal composition having a color-forming range of 34° C. to 39° C. can be obtained.

1-(C): In the formulation of 1-(A), in place of total amount of Ch.n-caproic acid, Ch.n-butyl carbonate is replaced, and a liquid crystal composition comprising clear color-formations and a color-forming range of 25° C. to 32° C. can be obtained.

1-(D): In the formulation of 1-(A), each content of Ch.n-heptyl carbonate. Ch.lauric acid and Ch.hydrogen terephthalate is made nothing, the content of Ch.2-ethyl hexanoate is made 9.5% by the addition of 2.5% thereof, and additional component of 9.5% Ch.n-butyl carbonate is added to allow the total component number to be six. Then a liquid crystal composition having a color-forming range of 20° C. to 30° C. can be obtained.

1-(E): In the formulation of 1-(D), a total amount of 9.5% Ch.n-butyl carbonate is replaced with Ch.phenylacetic acid, and a liquid crystal composition having also six components and a slightly narrower color-forming range of 20° C. to 27° C. compared with that of 1-(D) can be obtained.

1-(F): In the formulation of 1-(A), the total amounts of 9.0% Ch.n-capronic acid, 5.0% Ch.n-heptyl carbonate and 3.0% Ch.hydrogen terephthalate are replaced with Ch.benzyl carbonate, Ch.2,6-dimethyl-4-heptyl carbonate and Ch.hydrogen cyclopentane-1,3-dicarboxylate respectively, and a liquid crystal composition having a color-forming range of 28° C. to 34° C. can be obtained.

1-(G): In the formulation of 1-(F), a total amount of 4.0% Ch.lauric acid is replaced with Ch.anise carbonate, and a liquid crystal composition having a color-forming range of 25° C. to 32° C. can be obtained.

1-(H): In the formulation of 1-(A), a total amount of 5.0% Ch.n-heptyl carbonate is replaced with Ch.3,3,5-trimethyl-1-hexyl carbonate, a total amount of 4.0% Ch.lauric acid is replaced with Ch.hydrocinnamyl carbonate and a total amount of 3.0% hydrogen terephthalate is replaced with Ch.p-toluic acid, and a liquid crystal composition having a color-forming range of 23° C. to 31° C. can be obtained.

1-(I): In the formulation of 1-(A), a total amount of 9.0% Ch.carbonic acid is replaced with 3% Ch.active amyl carbonate, 3% Ch.n-amyl carbonate and 3% Ch.n-hexyl carbonate, a total amount of 7.0% Ch.2-ethylhexanoate replaced with 3.5% Ch.2-ethylbutyl carbonate 3.5% Ch.2-ethylhexyl carbonate and a total amount of 3.0% Ch.hydrogen terephthalate is replaced with Ch.3,5-dinitrobenzoic acid, and a liquid crystal composition having a color-forming range of 31° C. to 37° C. like as 1-(A) can be obtained.

1-(J): In the formulation of 1-(A), in place of 3% Ch.hydrogen terephthalic acid, 3% Ch.β-phenylpropionate, and a liquid crystal composition having a more clear color-forming range of 30° C. to 36° C. can be obtained, however, it has some decreased resistance to solid-crystalization.

1-(K): In the formulation of 1-(J), when the total amount of Ch.heptyl carbonate is excluded and in place thereof 5.0% Ch.trans-cinnamic acid is compounded, and a liquid crystal composition having a clear color-forming range of 25° C.–32° C., electro-magnetic radiations sensitivity can be obtained. Usually the loading content of Ch.trans-cinnamic acid as a photosensitive liquid crystal is suitably from 3.0–6.0%. If the amount thereof is more than these values, since the unphotosensitive portions thereof are easily sensitive during service, it has poor light resistance, so that is not commonly used.

A usual liquid crystal picture printed with one kind of color-forming liquid crystal will develop the same color at the same temperature, nevertheless. Even a picture using one kind of liquid crystal, if it has previously been subjected to electromagnetic irradiations so that the irradiated amount to be suitably controlled corresponding to each portion to be exposed through masking photographic film, filter, shutter, etc. and by the writing of laser beam, hereafter, it becomes possible to allow said pattern to develop multicoloration being different at each portion even at a same temperature according to irradiation dose without fail. As for unirradiated liquid crystal patterns in said Example, they form a color of green at 28.5° C., but after they are once subjected to a strong violet irradiation, they form same color at 27.5° C. accompanied by a decreased temperature of 1.00 degree. Quite a same irradiation operation is repeated 2 to 5 times with a color-forming temperature lowered by 1.0° C. for each of said irradiations.

Further, as for said 1-(J) formulation containing no Ch.cinnamic acid, when it is subjected to ultraviolet irradiation under the same conditions as described above, decrease in color-forming temperature thereof for each said radiation is 0.2° C., and said decrease should be considered a deterioration caused by ultraviolet, and as for the 1-(J) formulation containing 2.0% Ch.cinnamic acid compounded, said decrease in color-forming temperature is 0.5° C. for each. As for mixed liquid crystals containing Ch.cinnamic acid (commonly transform), since the double bond of the cinnamyl group of thereof produces radicals by partial cleavage due to the effect of irradiation, as well as said acid changes to Ch.truxillic acid or truxinic acid by photo-dimerization, thereby, the color-forming temperature of the mixture is estimated to be lowered in direct proportion to exposed dose on a definite range thereof, resulting in a clear color-formation and little deterioration due to the irradiation; therefore, said mixed liquid crystals are suitable for the use as photosensitive liquid crystals. These multicolor-forming liquid crystals are generally used together with ultraviolet protecting filter overlapped thereon.

Example 2

Formulation 2-(A): which comprises 38.0% Ch.pelargonic acid, 14.0% Ch.lauryl carbonate, 11.0% Ch.benzoic acid, 9.0% Ch.n-caproic acid, 8.0% Ch.n-butyl carbonate, 4.0% Ch.hexahydrobenzyl carbonate, 4.0% Ch.n-heptyl carbonate, 3.0% Ch.n-nonyl carbonate or Ch.capric acid, 5.0% Ch.2-ethylhexanoate, 3.0% Ch.p-aminobenzoic acid, 1.0% antioxidant compounded. Then, a liquid crystal composition having a color-forming range of 14° C.–23° C. can be obtained. It is necessary for Ch.n-nonyl carbonate, Ch.n-octyl carbonate and Ch.capric acid to have small maximum allowable contents and for the total contents of these compounds and Ch.pelargonic acid to be not more than 42.0%, and the former three compounds have an advantage to make color-formation clear.

2-(B): which comprises 40.0% Ch.pelargonic acid, 13.0% Ch.lauryl carbonate, 8.5% Ch.benzoic acid, 8.5% Ch.n-caproic acid, 8.5% Ch.phenylacetate, 4.5% Ch.heptyl carbonate, 4.5% Ch.3-ethyl-2-pentenoic acid, 4.5% Ch.2-ethylhexanoate, 4.5% Ch.2-ethylbutyl carbonate, 2.5% Ch.isopropyl carbonate and 1.0% antioxidant compounded. Then, a liquid crystal composition having a color-forming range of 20° C.–26° C. can be obtained.

2-(C): which comprises 40.0% Ch.pelargonic acid, 13.0% Ch.lauryl carbonate, 11.0% Ch.benzoic acid, 9.0% Ch.n-caproic acid, 9.5% Ch.n-butyl carbonate, 4.5% Ch.2-ethyl-3-octenyl carbonate, 5.0% Ch.n-heptyl carbonate, 5.0% Ch.2-ethylhexanoate, 3.0% Ch.suberane carboxylic acid and 1.0% antioxidant compounded. Then, a liquid crystal composition having a color-forming range of dark red at 0° C.–green at 10° C.–dark violet at 20° C. can be obtained.

2-(D): which comprises 45.0%, Ch.pelargonic acid, 14.5%, Ch.lauryl carbonate, 11.0% Ch.benzoic acid, 9.0% Ch.n-caproic acid, 10.5% Ch.n-butyl carbonate, 6.0% Ch.isobutyl carbonate, 3.0% Ch.hydrogen terephthalic acid and 1.0% antioxidant compounded, then, a liquid crystal composition having a color-forming range of dark red at 0° C.–green at 13° C.–dark violet at 26° C. can be obtained.

2-(E): which comprises 43.0% Ch.pelargonic acid, 14.0% Ch.lauryl carbonate, 11.0% Ch.benzoic acid, 8.5% Ch.n-caproic acid, 4.0% Ch.n-heptyl carbonate, 3.5% Ch.lauric acid, 5.0% Ch.2-ethylhexanoate, 3.0% Ch.hydrogen terephthalate, 3.5% Ch.chloride, 3.5% Ch.bromide and 1.0% antioxidant compounded, then, a liquid crystal composition having a color-forming range of 12° C.–23° C. can be obtained.

2-(F): which comprises 41.0% Ch.pelargonic acid, 10.0% Ch.benzoic acid, 5.0% Ch.oleic acid, 4.0% Ch.n-heptyl carbonate, 4.5% Ch.n-amyl carbonate, 4.5% Ch.isoamyl carbonate, 5.0% Ch.n-butyl carbonate, 5.0% Ch.isobutyl carbonate, 6.0% Ch.n-capronic acid, 4.0% Ch.lauric acid, 7.0% Ch.2-ethylhexanoate, 3.0% Ch.hydrogen terephthalate and 1.0% antioxidant compounded, then, a liquid crystal composition having a color-forming range of 22° C.–28° C. can be obtained.

2-(G): which comprises 42.0% Ch.pelargonic acid, 13.0% Ch.lauryl carbonate, 10.0% Ch.benzil carbonate, 4.0% Ch.n-heptyl carbonate, 6.0% Ch.n-capronic acid, 6.0% Ch.n-butyl carbonate, 6.0% Ch.2-ethylhexanoate, 6.0% Ch.isobutyl carbonate, 3.0% Ch.lauric acid, 3.0% Ch.hydrogen terephthalate and 1.0% antioxidant compounded, then, a liquid crystal composition having a color-forming range of 22° C.–30° C. can be obtained.

The liquid crystal compositions from 1-(A) of Example 1 to 2-(G) of Example 2 according to the present invention are possible to be of a plurality mixture each other, and the color-forming ranges of the resulting plural kinds of liquid crystal compositions are intermediate between those of said liquid crystal compositions.

Example 3

Formulation 3-(A): which comprises 5.0% Ch.oleyl carbonate, 38.0% Ch.pelargonic acid, 11.0% Ch.lauryl carbonate, 10.0% Ch.benzoic acid, 4.0% Ch.n-amyl carbonate, 4.0% Ch.isoamyl carbonate, 4.0% Ch.n-butyl carbonate, 4.0% Ch.isobutyl carbonate, 4.0% Ch.n-caproic acid, 4.0% Ch.n-hexyl carbonate, 5.0% Ch.2-ethylhexanoate, 3.0% Ch.lauric acid, 3.0% Ch.hydrogen terephthalate and 1.0% antioxidant compounded. Then, a liquid crystal composition having a color-forming range of 15° C.–25° C. can be obtained.

3-(B): which comprises 7.0% Ch.oleyl carbonate, 38.0% Ch.pelargonic acid, 14.0% Ch.lauryl carbonate, 9.0% Ch.benzoic acid, 8.0% Ch.n-caproic acid. 4.0% Ch.n-heptyl carbonate, 3.0% Ch.lauric acid, 8.0% Ch.phenylacetate, 5.0% Ch.2-ethylhexanoate, 3.0% Ch.hydrogen terephthalate and 1.0% antioxidant compounded, then, a liquid crystal composition having a color-forming range of 8° C.–15° C. can be obtained.

3-(C): which comprises 15.0% Ch.oleyl carbonate, 36.0% Ch.pelargonic acid, 12.5% Ch.lauryl carbonate, 8.5% Ch.benzoic acid, 6.5% Ch.n-caproic acid, 3.0% Ch.n-butyl carbonate, 2.5% Ch.n-heptyl carbonate, 2.5% Ch.lauric acid, 5.0% Ch.phenylacetic acid, 5.0% Ch.2-ethylhexanoate, 2.5% Ch.hydrogen terephthalate and 1.0% antioxidant compounded, then, a liquid crystal composition having a color-forming range of 5° C.–12° C. can be obtained.

3-(D): which comprises 30.0% Ch.oleyl carbonate, 30.0% Ch.pelargonic acid, 10.0% Ch.lauryl carbonate, 7.0% Ch.benzoic acid, 5.0% Ch.n-caproic acid, 2.5% Ch.n-heptyl carbonate, 2.5% Ch.n-butyl carbonate, 2.5% Ch.lauric acid, 2.5% Ch.isobutyl carbonate, 5.0% Ch.2-ethylhexanoate, 2.0% Ch.hydrogen terephthalate and 1.0% antioxidant compounded, then, a liquid crystal compound having a color-forming range of 0° C.–8° C. can be obtained.

3-(E): which comprises 50.0% Ch.oleyl carbonate, 18% Ch.pelargonic acid, 6.5% Ch.lauryl carbonate, 6.5% Ch.benzoic acid, 6.5% Ch.n-caproic acid, 2.5% Ch.2-ethyl-3-hexenoic acid, 2.5% Ch.8-phenylpropionate, 2.5% Ch.phenylacetic acid, 4.0% Ch.2-ethylhexanoate and 1.0% antioxidant compounded, then, a liquid crystal compound having a color-forming range of −2° C.–+3° C. can be obtained.

As for the compositions having Ch.oleyl carbonates compounded shown in said Example 3, Ch.2-ethylhexanoate, etc. having ethyl group as side chain will reasonably have important roles in addition to crystallization protection at lower temperatures.

Ch.oleyl carbonate is very important component in the present invention, and is an ester having strong smectic properties. The systems comprising the ester mixed, also due to its larger content and molecular weight more than those of the systems containing other esters, when once stored at low temperature, will inhibit its color-formation in spite of its returning to color-forming temperature; therefore, so long as films covering it are not slightly slipped, it only develops poor color. This is because Ch.oleyl carbonate is of a smectic phase at 18° C. or less, and if it is of a thin layer having films at the both faces thereof, it will remain smectic even if it is heated to make it cholesteric, nevertheless, successive heating will characteristically lead it to a isotropic liquid phase without via cholesteric phase.

Immediately after said mixed liquid crystal under color-formation falls in temperature and becomes no color-forming, it becomes glass transition, whereby if phase transition from cholesteric phase to smectic phase is inhibited, it becomes supercooling condition to be stabilized, with the mixed liquid crystals reminded as cholesteric phase or with a cholesteric phase having smectic phase partly mixed. Therefore, the decrease in color-forming clarity, caused by the temperature-rise from a lower to a color-forming temperature and by leaving it as it is, can be prevented. The fact that such preferred conditions at a lower temperature region can be held means, including the case comprising no Ch.oleyl carbonate formulated, that a superior protection effect on solid-crystallization at lower temperature is also produced.

As for the liquid crystal compositions of the present invention, each of Ch.alkyl carboxylic acid and alkenyl carboxylic acid and Ch.alkyl carbonate and alkenyl carbonate having ethyl group as side chain at the alkyl and alkenyl groups, is suitable, particularly for the protection of solid-crystallization thereof among which, taking other properties into consideration, Ch.2-ethylhexanoate, Ch.2-ethylbutyl carbonate, Ch.2-ethylhexyl carbonate, 2-ethyl-3-hexenoic acid, etc. are commonly used.

However, these Ch.esters will have decreased color-forming ranges with the increase of the contents thereof; therefore, they have a tendency to make their color-formation worsen. In such case, since some of Ch.esters of cyclic carbon compounds have a resistance to the worsening of the color-formation by said Ch.esters, and the suitable formations thereof are effective.

EMBODIMENTS OF COLOR-FORMING LIQUID CRYSTAL COMPOSITE PRODUCTS

It has been described above in detail about novel color-forming cholesteric liquid crystal compositions requiring no microencapsulization and permitting a long term preservation and use. In the following, it will be illustrated about color-forming liquid crystal composite products obtained by the composite utilization of transparent high molecular materials and said liquid crystal compositions.

Example 4

In this example, a method of protecting liquid crystals by means of electromagnetic irradiation curing was employed to obtain a tough transparent protecting film which gives no ill effects to the liquid crystal pictures obtained by printing with only liquid crystals being not microencapsuled and not dispersed in a vehicle or matrix, as well as adheres closely to the surface of the picture without containing no bubbles.

A mixed liquid crystal comprising 43.0% Ch.pelargonic acid, 14.5% Ch.lauryl carbonate, 9.0% Ch.n-butyl carbonate, 4.5% Ch.2-ethylhexanoate, 9.0% Ch.n-caproic acid, 11.0% Ch.benzoic acid, 2.5% Ch.hydrogen terephthalate, 2.7% Ch.$\beta$-phenylpropionate and 0.8% antioxidant was screen printed on a base board using a 505-mesh plate in an atmosphere temperature of 40° C. to obtain a liquid crystal picture 10 microns thickness, then annealed for 2 minutes at 70° C. Thereto was applied using knife coater a quick-drying ultraviolet-curing resin to obtain a coating having a total thickness of 41–43 microns including the thickness of the liquid crystal surface, at the same time, the coated material was subjected to a moving-irradiation on a conveyer under irradiation of a high-intensity ultraviolet rays to form a transparent curing film all over the surface including that of the liquid crystal. In this case, a black or black painted plastic film is preferable as a base board, and after the curing of the coating resin, if necessary, the base board was sandwiched with gas barriering films at the both faces, in addition, the transparent film was covered with ultraviolet protecting film.

In this example, a black polyester film of 50 microns thickness was used as a base board, a 45 microns thickness of coating film comprising liquid crystal picture was applied thereon, further the surface was covered with ultraviolet protecting film of 50 microns thickness partly for scuff proofing, etc. by dry lamination to be of 7 microns thickness, then a total thickness of about 0.15 mm liquid crystal picture sandwiched between films was prepared. This liquid crystal film, being difference from the printing using microencapsulized liquid crystals, formed extremely clearly colored dark red at 21° C., concentrated red at 22.5° C., orange at 24.0° C., green at 25.5° C., blue at 27.0° C., violet at 28.5° C. and dark violet at 30.0° C. stably for a long period of time as well as with the occurrence of no deterioration. This liquid crystal film was resistant to various processings, and could satisfactory coped with bending, punching at the portions other than picture portions, adhesion at the back surface, etc.

Example 5

One part of secondary acetyl cellulose having an acetylation degree of 51 was dissolved in two parts of ethylene glycol monomethyl ether which has a greater polarity as a solvent as well as little solubility for Ch.esters. In the solution was mixed, stirred and homogeneously dispersed 0.5 parts of mixed Ch.ester liquid crystals used in Example 4 at 40° C. to make the dispersed particle size less than 50 microns. The obtained solution was extruded by a conventional method into an atmospheric air to allow the solvent contained to be evaporated to obtain a liquid crystal film of 40 microns thickness.

On to one surface of said liquid crystal film was laminated a black film of 50 microns thickness, and onto the other surface a transparent polyester film of 50 microns thickness for protection and reinforcement respectively. In this case, the surface of the liquid crystal film having mesomorphic liquid crystals partly bleeded: therefore, conventional adhesives for dry lamination were unsuitable, and transparent denaturated acrylic adhesives used being hardly affected with adhering oil. Such obtained liquid crystal film had a color-forming range similar to that of Example 4, also had clear color-formation. Nevertheless, as for a comparison of their vividness, it was a little inferior to Example 4.

Further, liquid crystal films, having different color-forming ranges each were prepared, then they were laminated each other by using said adhesives to produce a liquid crystal film having a wider color-forming range. The liquid crystal film obtained in accordance with said Example is endurable for general indoor-use for long periods as sheet and leather cloth, and could satisfy a variety of demands such as punching, bending, adhesion, etc.

Example 6

About 120-denier filament of conjugated fiber was prepared by a conventional dry spinning mechanism with an lowered operating speed lowed using two types of A- and B spinning dopes. The A-spinning dope is the same acetyl cellulose solution comprising mixed liquid crystal as used in Example 5 and the B-spinning dope is the acetyl cellulose solution comprising no mixed liquid crystal but comprising ultraviolet protecting agent, etc. dissolved. The spinneret used is for conjugate fibers, and is formed so that the inner portion thereof is used for the A-spinning dope and the outer thin portion surrounding said inner portion is for the B-spinning dope. The outer covering of the B-spinning dope is for the protection of liquid crystal and the reinforcement of fiber. Accordingly, even if the dopes are not spinned as conjugate fiber, coating application to the surface of finished filaments before oiling are available. In this case, since the coating agent envelopes the liquid crystal fiber, if the coating agent is flexible and tough, its adhering strength to the liquid crystal fiber is not required to be so strong in practical use.

The liquid crystal acetate threads such obtained and the cloth woven from the fiber will form colors at about the same temperatures as in Example 4, and are endurable for usual handling to be stable for a long time.

Example 7

As a liquid crystal coating, the acetyl cellulose solution comprising mixed liquid crystals used in Examples 5 and 6 can be used as it is. The use of other synthetic resin coatings or emulsion coatings will allow the purpose of this example to also be achieved. In this Example, liquid crystal coatings using butyral resin will be described. One part of butyral resin comprises an average degree of polymerization 250-500, 15 - 0 25 (wt%) residual hydroxyl group, not more than 3 (molar ratio %) residual acetyl group and a degree of butyralation of 60 (molar ratio %) was dissolved into two parts of an equivalent mixture of methanol/ethanol having 2% water added. In this solution was mixed, stirred at 40° C., and homogeneously dispersed 0.4 parts of the Ch.ester mixed liquid crystal being used in Examples 4, 5 and 6 to make the dispersed particle size less than 50 microns.

Since said liquid crystal coating had too low viscosity for brushing and screen printing inks, the solvents therein was removed by a rotary evaporator to obtain a suitable range of viscosities to cope with the problem.

A dry coating film of 20 microns thickness and a dry ink surface of 14 microns thickness from screen printing which were prepared from said liquid crystal coating showed clear color-formation within a color-forming range being approximately same as in Examples 4 to 6, and were stable for along time, in addition, showed preferred adhesion strength to a variety of materials.

EXAMPLES OF A METHOD FOR PROTECTING LIQUID CRYSTALS

This is a method for protecting liquid crystals using electromagnetic curing resin, but not using microencapsulization, as already illustrated in Example 4.

Example 8

A base board used for liquid crystal sample corresponding to printing is prepared first. The preparing method thereof is as follows:

The method of producing said base board which comprises applying conventional adhesive cellophane tape of 3 mm width to the slide glass plate for microscope along the longer direction on the both side surfaces thereof; mounting a suitable amount of an transparent ultraviolet curing resin at one end of the glass surface of about 19 mm width occupying the middle longer direction surface of said glass plate; squeezing said resin toward the other end of the glass by a doctor knife; whereby coating said resin of 50 microns thickness, being the same thickness as that of the cellophane tape to allow the both surfaces to be of a same plane.

Thereto was applied ultraviolet rays to make the resin cured. Using said cured composite as the base board, the liquid crystals were printed by the use of a 350- to 500-mesh screen using no solvents at 47° to 52° C., and after the annealing thereof at 60° C. to 70° C. for 2 to 3 minutes, a protecting film was applied thereto according to the present method.

A low temperature irradiation method is capable of curing the resin by instantaneous irradiation with little increased temperature; therefore, a film-formation is achieved with their liquid crystals hardly influenced, that is, said method is extremely excellent, however, is difficult to be conducted commonly. Then, in this example, ultraviolet irradiation is employed.

The resin used has a composition comprising 40–50% polyene, 50–60% polyester, and a total of at least 4% of photochemical reaction initiator and stabilizer mixed (as resin to be used is not restricted to said type, and can be relatively freely selected, a press polymerization is available) and has a viscosity of 2,500–3,000cps.

When atmospheric temperature rises, since the viscosity of the resin decreases, the coating was conducted at not more than 20° C. for good results.

As an ultraviolet irradiation apparatus, a system made by U.S. Fusion System Inc. is employed wherein a non-polar mercury lamp (lamp input: 300w/inch, UV output: 97w/inch, infrared rays output: 55w/inch) is driven with microwave, and together with a heat radiation cutting quartz plate was used.

These were set on a sample transporting conveyor so that the focus of the ultraviolet rays to be on the sample surface, and the conveyer speed as set at 26 cm/sec. This is because, since the resin to be cured has a thickness as thin as 50 microns, the irradiation time can be made shorten.

After the printing of liquid crystal pattern and the annealing thereof, as in the case of preparation of said base board, with the cares not to touch the liquid crystal pattern occupying the longer direction-middle portion of the sample, on said cellophane tapes adhered to a longer direction of the sample surface at the both sides of 3 mm width from the edges were additionally superposed with fresh cellophane tapes, and on the end portion of the sample surface was placed a suitable amount of liquid resin to be coated, then just after the liquid crystal picture was covered with the resin of 50 microns thickness squeezed using a doctor knife, the resulting sample was placed on the conveyer near the irradiation focus for ultraviolet irradiation to obtain a transparent cured protection film.

It is important that a time lag until the resin loses its fluidity is allowed to be shorten as much as possible.

The time lag at an environmental temperature of 20° C. together with under said conditions is up to two seconds, preferably up to 1.5 seconds. If it exceeds said time, the resin film may be suffered from film-break and crater.

In order to realize the present invention industrially, an exclusive apparatus is necessary which allows the resin coating and electromagnetic irradiation processes to be conducted continuously as one united process by bringing said both processes as near as possible. While, under certain cases, it is more preferable to use a spot radiation apparatus and shutters without the movement of a radiation source and exposed materials.

In the present invention, as stated above in spite of the fact that on the liquid crystal thin film of patterns there is resin film which absorbs ultraviolet rays and react with them, some of the ultraviolet rays are liable to be absorbed by the liquid crystals accompanied by the deterioration thereof: therefore, careful tests were repeated. In the following, a typical example in such case is illustrated.

For printing, mixed liquid crystals were used which comprise 45.0% Ch.pelargonic acid, 14.5% Ch.lauryl carbonate, 11.5% Ch.benzoic acid, 9.0% Ch.n-capronic acid, 5.0% Ch.n-heptyl carbonate, 4.0% Ch.lauric acid, 7.0% Ch.2-ethylhexanoate, 3.0% Ch.hydrogen terephthalate and 1.0% antioxidant. And the pattern was to be of 9.8-10.0 microns in thickness.

The preparing conditions of sample are quite same as in the case mentioned above.

The sample having no protecting film formed (nacked sample) forms green at 36.0° C., and in this connection if said sample (being left nacked) is exposed to ultraviolet rays, green-formation occurs at 34.0° C. with 2.0° C. decreased (when the pattern thickness is 14.5-15.0 microns, the decease in the color-formation temperature is 1.2° C.).

In the above case, however, as for a sample irradiated after being coated with the liquid resin, green-formation occurs just after the annealing of the film at 33.0° C. with 3.0° C. decrease. Nevertheless, after the sample was left to stand for one month, the color-forming temperature returned to 34.0° C., and after two months to 35.0° C., hereinafter, the temperature became stably constant.

After the application of said curing protection film according to said manner, additional ultraviolet irradiations were repeated many times under the same conditions, however, the decrease in color-forming temperature per irradiation was only 0.1° C., as for the sample having a film of 100 microns (the thickness of which on the liquid crystal pattern is 90 microns), said thickness were obtained by the twice applications of a film of 50 microns thickness. Then three times of irradiations were conducted, but no decrease in color-forming temperature was observed.

Based on the above test results, it was concluded that the temperature drop of 3.0° C. was not due to the ultraviolet deterioration of the liquid crystal, but due to the strong effect by the coating of the resin upon the coordination of the liquid crystal molecules. And the following test was conducted to confirm such conclusions.

On said base board was placed the liquid crystal, covered with a cover glass plate of which ultraviolet transmission was identified to be at least 70%, and temperature and pressure applied thereto to obtain a liquid crystal thin film of 12 microns thickness, then the same ultraviolet irradiation test was conducted as stated above to find no decrease in color-forming temperature, and there occurred nothing requiring the change of said conclusion.

Further, the variation with time after two years between the samples subjected to extra ultraviolet irradiation and the contrary was not detected.

As for compounds comprising much cholesteryl alkenyl carboxylic acid and cholesteryl alkenyl carboxylic carbonate, or compounds containing halo-groups are liable to be affected by irradiation, and some of them develop the effects by irradiation later; therefore, an excess of irradiation should not be applied.

Since the electromagnetic radiation of the present invention is employed to make the fluidity of the resin for film-use lost in a time as short as possible, a complete curing of the resin is not required; therefore, irradiation dose to liquid crystals can be decreased by providing the resin to be used with curing properties such as thermosetting properties and the other setting properties.

Hence, the electromagnetic curing resins used by the present invention can contain other types of the resins given with other setting properties.

EMBODIMENTS OF COLOR-FORMING LIQUID CRYSTAL PICTURE LAMINATED PRODUCTS

Example 9

This example relates to films with temperature sensitive properties and are suitable for ornamental applications.

This example composed of four layers of liquid crystal pictures having different color-forming ranges and patterns each, and the liquid crystals used are cholesteric liquid crystal compositions not microcapsulated according to the present invention. The components and color-forming ranges are illustrated in the following.

The first layer:

This layer comprises 45.0% pelargonic acid, 14.5%, Ch.lauryl carbonate, 11.0%, Ch.benzoic acid, 8.5%, Ch.n-caproic acid, 4.5%, Ch.n-heptyl carbonate, 1.5%, Ch.n-butyl carbonate, 4.0%, Ch.lauric acid, 7.0%, Ch.2-ethylhexanoate, 3.0%, Ch.hydrogen terephthalate and 1.0% antioxidant, and the color-formation thereof range are a first appearance of red at 30.0° C.–dark red at 31.0° C. –orange at 32.0° C.–green at 33.0° C.–blue at 34.0° C.–violet at 35.0° C.–dark violet at 36.0° C.

The second layer:

This layer comprises 44.0% pelargonic acid, 14.0%, Ch.lauryl carbonate, 11.0%, Ch.benzoic acid, 8.5%, Ch.n-caproic acid, 4.0%, Ch.n-heptyl carbonate, 6.0%, Ch.n-butyl carbonate, 3.0%, Ch.lauric acid, 5.5%, Ch.2-ethylhexanoate, 3.0%, Ch.hydrogen terephthalate acid and 1.0% antioxidant, and the color-formation thereof ranges are a first appearance of red at 24.0° C.–green at 29.0° C.–dark violet at 33.0° C.

The third layer:

This layer comprises 42.5% pelargonic acid, 13.5% Ch.lauryl carbonate, 11.0% Ch.benzoic acid, 8.5% Ch.n-caproic acid, 4.0% Ch.n-heptyl carbonate, 9.0% Ch.n-butyl carbonate, 2.5% Ch.lauric acid, 5.0% Ch.2-ethylhexanoate, 3.0% Ch.hydrogen terephthalate and 1.0% antioxidant, and the color-formation thereof ranges from a first appearance of red at 17.0° C.–green at 23.0° C.–dark violet at 28.0° C.

The fourth layer:

This layer comprises 42.0% pelargonic acid, 13.5% Ch.lauryl carbonate, 11.0% Ch.benzoic acid, 8.5% Ch.n-caproic acid, 2.0% Ch.n-heptyl carbonate, 9.0% Ch.n-butyl carbonate, 2.0% Ch.n-amyl carbonate, 2.0% Ch.lauric acid, 4.0% Ch.2-ethylhexanoate, 2.5% Ch.isobutyl carbonate, 2.5% Ch.hydrogen terephthalate and 1.0% antioxidant, and the color-formation thereof ranges from a first appearance of red at 7.0° C.–green at 15.0° C.–dark violet at 21.0° C.

The present example employs a composition composed of said layers, but a composition comprising the components of said first and fourth layers mixed as its the second and third layers may be provided with approximately same results as those in the present example.

In the present example, the composition is designed to have a low temperature sensitive layer accompanied by a wider color-forming range as well as designed to have a higher temperature sensitive layer accompanied by a narrower color-forming range. This is because that in a room for general-purpose, when an environmental temperature is lower, its room temperature is susceptible to a greater temperature-variation due to the effects of a heater, etc., so that the visible liquid crystal pattern and color-formation are also susceptible to variation, on the contrary, the room temperature tends to have less temperature-variation with more increased temperature. Said design of the layers is attempted for the possibly decreased variation of the patterns and color-formation.

Since the principal service objectives of the present product is in that it is used for interior displays, interior decorations or dress accessories, when its temperature changes to a medium point between a temperature at which the present pattern-picture is under color-formation and a temperature at which another pattern-picture will be subsequently under color-formation, unwillingly the former pattern picture under color-formation will disappear and the later will not form color yet.

Therefore, the color-forming range of each liquid crystal is set so that a new pattern may appear prior to the disappearance of the preceding pattern with the temperature change.

Since such construction of color-forming ranges sometimes give rise to double pictures, the liquid crystals of this example are designed to have a deep color-formation from red to green with uniform clearness, and to have a extremely decreasing color-formation from blue to violet (Ch.benzoic acids or the like has the functions to strengthen the color-formation of red, and to decrease the color-formation from blue to violet). As a result, if the first appearance of red of the present pattern and the blue of the preceding (or subsequent) pattern are constructed so as to be superposed, the patterns seem to change unexpectedly naturally because of the great degree of effect of red to vision.

In the following, the procedures for preparing the film-like laminated product according to this example will be illustrated.

To start with, usually onto a black plastic film to be used as a base board, which is treated so that film-coating resin may be applicable, are printed said first layer of liquid crystals, in an atmosphere at 45° C. or more including the base board by using a cylindrical 500-mesh screen having a suitable picture pattern with no solvents, and after the printed film is annealed at 65° C.-70° C. for 1.5-2 min., it is coated at 20° C. or less with an ultraviolet-curing resin of 50 microns thickness and simultaneously irradiated with ultraviolet to cure the coating for obtaining a protecting film. As for the ultraviolet-curing resin and the ultraviolet irradiating apparatus used were the same types thereof of the Example 8.

Next, thereon is applied said second layer according to the same procedure as in those in the first layer; further are laminated the third and the fourth layers successively. After a final protecting film is formed, the obtained product is annealed, if necessary, thereon are applied a gas-barriering film and a transparent ultraviolet protecting film to produce a completed product.

As for the film-like liquid crystal picture laminated product which was prepared according to the present invention, four-fold quite different pictures can appear or disappear and color-formation vary from red to blue with clear coloration, and different colors and patterns can be seen depending not on temperature change but on the angles for us to look at the pictures by the effects of selective scattering. Therefore the present products can be used from small goods such as accessories to large articles such as wall paper providing novel visual effects.

Example 10

The present example relates to a thread being a fiber-like liquid crystal laminated product.

The preparation method of the present product is essentially the same as that of the film-like laminated product for decoration having temperature sensitivity in Example 9. The base board to be used is a continuous film (hereafter referred to as a web) and since the web is cut into fine strips by a slitting machine at the final processing step, almost all machines to be operated were replaced for the another ones. A transparent easy adhesion type of film was used as a web which comprises an ultraviolet absorber blended together with a gas barrier layer of 30 microns thickness and 110 mm width laminated. On this easy adhesive surface one hundred of parallel fine lines of 0.5 mm width and 9 microns thickness were printed endlessly at a space of 0.3 mm lengthwise by a metal rotary screen-printer of 500 mesh, at 57.0° C.-60° C. The liquid crystals used for the printing are the same as those in the first layer of the film-like laminated product of Example 9. The liquid crystals used in the second and the later layers are the same as those used in the second and the later layers of Example 9 respectively. After the completion of said printing, the back side temperature of the web and the surface temperature thereof were cooled to 20° C. or less continuously by a cooling roll and cooling air respectively. However, since the resulting film being in such condition was unable to be rolled up, successively it was subjected to a protecting film-forming process, wherein the coating resin and the resin curing apparatus used were the same as those used for the production of film-like laminated products in Example 9, and the coating was conducted using a knife-over-roll coater having a backup roll and a triangular thin edge. The web, just after the coating process, was passed through the resin curing apparatus to form a cured protecting film of 35 microns thickness, then was rolled up with a winder mounted on a small edge position control (generally called EPC) having high performance.

The winding-up speed had a rather slow rate of 16 m/sec. due to the limited capacity of ultraviolet irradiation of the resin curing apparatus.

Then, the winded film was transferred to an unwinder (unwind machine), then thereon were laminated the second, the third and the fourth layers in order.

In this case, greatest attention was given so that either sides of slippages among the liquid crystal line images on said layers may not appear when observed from right above. In order to overcome this problem, it is desirable that the winded web is rewinded by using a high performance of EPC, then the same apparatus used for the first layer are repeatedly used to exchange only liquid crystals to be used for another ones.

In spite of the width of the web used in the present example is extremely as narrow as 110 mm, owing to said reasons and the slitter, it is necessary for the printing to have an accuracy as high as possible, and it is important to have uniform web edge position together with web tention control. A controlled tension of the web was provided by the installation of a high-accuracy of infield tension control before the printing unit and a high-accuracy of outfield tension control after the resin curing unit, together with by the combination use of unwinding and rewinding machines.

On the surface of the protecting film of the laminated webs carefully prepared as mentioned above was laminated the same film as that used for the base board as a surface film of this example and the film has a width slightly decreased; when necessary, the base board side was treated with black. In addition, the printed liquid crystals were advantageously annealed by heating by means of dry lamination. Finally, the webs such obtained were finely cut by a conventional slitter used for preparing gold and silver threads and wound up as threads; wherein the webs were kept at the temperatures as those when printing. Also in this cases as in said printing, a higher-accuracy of slitting was essential, it was necessary that middle spaces between individual liquid crystal linear pictures were slitted and each of the automatic control systems has higher function.

For practical use, when the threads and cloths are cut, since there is adhesive force resulted from too thin thickness of the liquid crystals layers, the liquid crystals will not leak from the corresponding cut ends. However, in order to prevent them from environmental contaminations and from oxidation which progresses into the liquid crystals through the cut ends, it is required for the cut ends to be protected. And for this purpose, various types of transparent solventless fast-curing adhesives can be applied. Also, the ultraviolet curing resin used in this example is effectively employed by curing it with a handy type of ultraviolet irradiating device. Such obtained liquid crystal threads are stable for a long time and sufficiently strong, so that cloths and embroidered designs can be made according to some conventional same methods as those for gold and silver threads. The threads of this example can form colors clearly, and the color-formations vary successively according to the temperatures changing over a wide range, and also vary depending upon the angle change of sight, providing us with novel and aesthetic feeling to produce particularly preferred effects on interior decorations and dress accessories, etc.

Example 11

The present example relates to a liquid crystal thermometer. This type of thermometer is for general use which comprises a measuring temperature range of 4.0° C. to 36.0° C. at intervals 3° C., 11 types of digits and 10-step layers. That is, this type of thermometer is made of liquid crystals comprising digits of 5,8,11,14,17,20,23,26,29,32,35 color-formed in green in accordance with each corresponding temperature, and is manufactured by the printing-lamination method just as in Example 9. The liquid crystals are green at the temperatures corresponding to the display digits, an when the temperatures are lower than those of the display digits by 1.0° C., they are designed to form color in red, while, when higher by 1.0° C., in blue, and when higher or lower by 1.5° C. than the display digits, the displays are designed to have images superposed. But, it is not difficult for us to read the images because the color-formation at the higher temperature by 1.5° C. is violet and at the lower temperature is a first appearance color of red.

Since the liquid crystals with high color-forming temperatures have clear and deeper color-formation, they are laminated so as to be close to the base board, on the other hand, the liquid crystals with lower color-forming temperatures are laminated so as to be close to the surface of the product.

In order to read the color-formed liquid crystal digital displays at the bottom, it is required to see the digits through ten layers of transparent liquid crystal digit patterns. A liquid crystal obtained by a 500-mesh screen printing liquid crystal pattern is about 10 microns in thickness; so that even if ten layers thereof are laminated, the total thickness is as thick as 0.1 mm to provide us with little difficulty as long as each of protecting film is transparent.

In the following, the liquid crystal compositions for the thermometer will be described.

Composition for green color-formation at 35° C.:

The composition comprises 45.0% Ch.pelargonic acid, 14.5% Ch.lauryl carbonate, 11.0% Ch.benzoic acid, 9.0% Ch.n-caproic acid, 5.0% Ch.n-heptyl carbonate, 4.0% Ch.lauric acid, 8.2% Ch.2-ethylhexanoate, 2.5% Ch.hydrogen terephthalate and 0.8% antioxidant.

Composition for green color-formation at 17.0° C.:

The composition comprises 40.0% Ch.pelargonic acid, 14.0% Ch.lauryl carbonate, 9.0% Ch.benzoic acid, 6.0% Ch.n-caproic acid, 3.0% Ch.n-heptyl carbonate, 3.0% Ch.lauric acid, 5.0% Ch.2-ethylhexanoate, 2.0% Ch.hydrogen terephthalate, 4.0% Ch.isobutyl carbonate, 7.0% Ch.phenyl acetate, 6.0% Ch.oleyl carbonate, and 1.0% antioxidant.

Composition for green color-formation at 5.0° C.:

The composition comprises 25.0% Ch.pelargonic acid, 9.0% Ch.lauryl carbonate, 7.0% Ch.benzoic acid, 6.0% Ch.n-caproic acid, 2.0% Ch.n-heptyl carbonate, 6.0% Ch.butylcarbonate, 4.0% Ch.2-ethylhexanoate, 40.0% Ch.oleyl carbonate, and 1.0% antioxidant.

Each of the liquid crystal compositions for green color-formation at 32.0° C., 29.0° C., 23.0° C. and 20.0° C. is produced by mixing said compositions for green color-formation at 35.0° C. and 17.0° C.; and each of the liquid crystal compositions for green color-formation at 4.0° C., 11.0° C., and 8.0° C. is produced by mixing said compositions for green color-formation at 17.0° C. and 5.0° C.

The liquid crystal thermometer manufacture according to this example is a liquid crystal laminated product; therefore, easily readable larger display digits can be given even in a smaller displaying space, further, some patterns can be printed together with the temperature displaying digits to allow the thermometer to be provided with design effects.

In addition, different displays such as letters or marks, relating to temperature, but other than the temperature displaying digits can be given in various combinations thereof in a same space regardless of temperature change.

Example 12

The present example relates to a thermographic sheet for displaying a heat distribution image.

This thermographic sheet comprising up to four liquid crystal layers is suitable for usual applications.

The method of producing this sheet is approximately similar to that in Example 9 except for the great difference in liquid crystal patterns between the both examples.

Since a conventional products is composed of one layer of color-forming liquid crystals, there can occur no problems such as those in this example. As for said thermographic sheet, since it has plural liquid crystal layers having different color-forming ranges, the resulting problems are particularly serious.

It is necessary to make each image pattern characteristic so as to make it possible to identify correctly and immediately on sight the color-forming range of the liquid crystal under color-formation at an arbitrary position on the surface of the thermographic sheet according to the present invention, along with to make the liquid crystal be printed like a solid printing for the clearer temperature expression available even if the area of said arbitrary position is extremely small.

In the present example, at each layer the temperature at which the liquid crystals form a green color-formation was printed in a small digital pattern, using a printing plate permitting the liquid crystals to be closely printed with thin lines all over the surface of the sheet except the digit, as a result, a temperature expressed with black thin lines of display digits were allowed to be readable by making a black back surface visible transparently through the portions of the digits during said liquid crystals being under color-formation.

In addition, depending on applications, it is desirable to use various thin lines and closed marks for expressions and identifications.

When transparent protecting films are applied according to the method for protecting the liquid crystals mentioned above, it is essential that not only the surfaces of liquid crystal patterns but also the neighboring surfaces except for the patterns are simultaneously coated. As in thermographics, when liquid crystals are printed almost as a solid printing, anchors for protecting films are needed to be uniformly applied almost all over the surface thereof.

Therefore, the black resist printing portions such as black resist printing digits, black resist printing lines, various marks and patterns, etc. can play their own rolls, as anchors.

A thermographic sheet prepared with such caution according to the embodiment of the present invention can be of a high sensitive type being responsive to a little change in temperature by a decreased color-forming range per layer, at the same time can have a wider color-forming range as a whole, and can provide a conventionally unobtainable novel minute heat distribution image having a high sensitivity and a wider color-forming range.

What is claimed is:

1. A cholesteric liquid crystal composition comprising:
    (A) 3.00 to 47.0 wt % of cholesteryl pelargonic acid;
    (B) 8.0 to 19.0 wt % of cholesteryl lauryl carbonate;
    (C) 6.0 to 13.0 wt % of cholesteryl benzoic acid;
    (D) 3.0 to 12.0 wt % of one or more compound selected from the group consisting of cholesteryl 2-ethylhexanoate, cholesteryl 2-ethylbutyl carbonate, and cholesteryl 2-ethylhexyl carbonate;
    (E) 5.0 to 10.0 wt % of a compound selected from the group consisting of cholesteryl caproic acid, cholesteryl n-butyl carbonate, and a cholesteryl benzyl carbonate;
    (F) 0 to 30.0 wt % of cholesteryl oleyl carbonate; and
    (G) one or more compounds selected from the group consisting of (a) to (i), wherein the content thereof is equal to 100% minus the sum of (A) to (F), and wherein
    (a) is a cholesteryl alkyl carboxylate represented by the general formula $C_nH_{2n+1}COO.Ch$, wherein n is an integer of 4 to 11,
    (b) is a cholesteryl alkenyl carboxylate represented by the general formula $C_nH_{2n-1}COO.Ch$, wherein n is an integer of 4 to 17,
    (c) is a cholesteryl 3-chloropropionate,
    (d) is a cholesteryl halogen,
    (e) is a cholesteryl alkyl carbonate represented by the general formula $C_nH_{2n+1}OCOO.Ch$, wherein n is an integer of 3 to 18,
    (f) is a cholesteryl alkenyl carbonate represented by the general formula $C_nH_{2n-1}OCOO.Ch$, wherein n is an integer of 3 to 18,
    (g) is a carboxylate and carbonate of cholesteryl aromatic compound represented by the general formula:

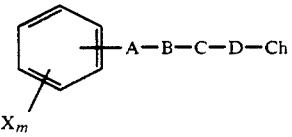

wherein A is $(C_nH_{2n})_P$, B is $(CH=CH)_Q$, C is $(COO)_S$, D is $(O.COO)_T$, P is 0 or 1, Q is 0 or 1, P+Q is 0,1 or 2, S is 0 or 1, T is 0 or 1, S+T is 1, n is 0 or an integer of 1 to 6, m is 0, 1 or 2, X is an alkyl group having 1 to 4 carbon atoms, an alkoxyl group having 1 to 3 carbon atoms, a nitro group, an amino group, a carboxyl group, or a halogen group,
    (h) is cholesteryl carboxylates of carbon 4 to 7 member alicyclic compound, and
    (i) is cholesteryl monoesters which are hydrogen dicarboxylates of carbon 4 to 7 member alicyclic compound;
wherein the cholesteryl in (A) to (G) is represented by a formula of $C_{27}H_{45}$ and contains cholestanyl esters.

2. A liquid crystal film comprising an image of the liquid crystal composition of claim 1 sandwiched between a base board and a transparent protecting film.

3. A liquid crystal film comprising a mixture of the liquid crystal composition of claim 1 and a transparent high macromolecular substance.

4. A liquid crystal fiber comprising a mixture of the liquid crystal composition of claim 1 and a transparent high macromolecular substance.

5. A liquid crystal fluid comprising the liquid crystal composition of claim 2 and a transparent high macromolecular substance dissolved or dispersed in solvents.

6. A color-forming liquid crystal picture laminated sheet comprising a plurality of liquid crystals having different color-forming temperatures each crystal printed or pictured as laminates on a base board by applying the transparent protecting film to each liquid crystal.

7. A laminated sheet according to claim 6 wherein said liquid crystal composition is a cholesteric liquid crystal composition including:
    (A) 3.00 to 47.0 wt % of cholesteryl pelargonic acid;
    (B) 8.0 to 19.0 wt % of cholesteryl lauryl carbonate;
    (C) 6.0 to 13.0 wt % of cholesteryl benzoic acid;
    (D) 3.0 to 12.0 wt % of one or more compounds selected from the group consisting of cholesteryl 2-ethylhexanoate, cholesteryl 2-ethylbutyl carbonate, and cholesteryl 2-ethylhexyl carbonate;

(E) 5.0 to 10.0 wt % of a compound selected from the group consisting of cholesteryl caproic acid, cholesteryl n-butyl carbonate, and a cholesteryl benzyl carbonate;

(F) 0 to 30.0 wt % of cholesteryl oleyl carbonate; and (G) one or more compounds selected from the group consisting of (a) to (i), wherein the content thereof is equal to 100% minus the sum of (A) to (F), and wherein (a) is a cholesteryl alkyl carboxylate represented by the general formula $C_nH_{2n+1}COO.Ch$, wherein n is an integer of 4 to 11, (b) is a cholesteryl alkenyl carboxylate represented by the general formula $C_nH_{2n-1}COO.Ch$, wherein n is an integer of 4 to 17, (c) is cholesteryl 3-chloropropionate, (d) is a cholesteryl halogen, (e) is a cholesteryl alkyl carbonate represented by the general formula $C_nH_{2n+1}OCOO.Ch$, wherein n is an integer of 3 to 18, (f) is a cholesteryl alkenyl carbonate represented by the general formula $C_nH_{2n-1}OCOO.Ch$, wherein n is an integer of 3 to 18, (g) is a carboxylate and carbonate of cholesteryl aromatic compound represented by the general formula:

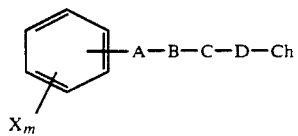

wherein A is $(C_nH_{2n})_P$, B is $(CH=CH)_Q$, C is $(COO)_S$, D is $(O.COO)_T$, P is 0 or 1, Q is 0 or 1, P+Q is 0, 1 or 2, S is 0 or 1, T is 0 or 1, S+T is 1, n is 0 or an integer of 1 to 6, m is 0, 1 or 2, X is an alkyl group having 1 to 4 carbon atoms, an alkoxyl group having 1 to 3 carbon atoms, a nitro group, an amino group, a carboxyl group, or a halogen group, (h) cholesteryl carboxylates of carbon 4 to 7 membered alicyclic compound, and (i) is cholesteryl monoesters which are hydrogen dicarboxylates of carbon 4 to 7 member alicyclic compound; and wherein the cholesteryl in (A) to (G) is represented by a formula of $C_{27}H_{45}$ and contains cholestanyl esters.

8. A laminated yarn, wherein said liquid crystal composition is a cholesteric liquid crystal composition including:

(A) 3.00 to 47.0 wt % of cholesteryl pelargonic acid;

(B) 8.0 to 19.0 wt % of cholesteryl lauryl carbonate;

(C) 6.0 to 13.0 wt % of cholesteryl benzoic acid;

(D) 3.0 to 12.0 wt % of one or more compounds selected from the group consisting of cholesteryl 2-ethylhexanoate, cholesteryl 2-ethylbutyl carbonate, and cholesteryl 2-ethylhexyl carbonate;

(E) 5.0 to 10.0 wt % of a compound selected from the group consisting of cholesteryl caproic acid, cholesteryl n-butyl carbonate, and a cholesteryl benzyl carbonate;

(F) 0 to 30.0 wt % of cholesteryl oleyl carbonate; and (G) one or more compounds selected from the group consisting of (a) to (i), wherein the content thereof is equal to 100% minus the sum of (A) to (F), and wherein (a) is a cholesteryl alkyl carboxylate represented by the general formula $C_nH_{2n+1}COO.Ch$, wherein n is an integer of 4 to 11, (b) is a cholesteryl alkenyl carboxylate represented by the general formula $C_nH_{2n-1}COO.Ch$, wherein n is an integer of 4 to 17, (c) is cholesteryl 3-chloropropionate, (d) is a cholesteryl halogen, (e) is a cholesteryl alkyl carbonate represented by the general formula $C_nH_{2n+1}OCOO.Ch$, wherein n is an integer of 3 to 18, (f) is a cholesteryl alkenyl carbonate represented by the general formula $C_nH_{2n-1}OCOO.Ch$, wherein n is an integer of 3 to 18, (g) is a carboxylate and carbonate of cholesteryl aromatic compound represented by the general formula:

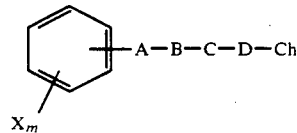

wherein A is $(C_nH_{2n})_P$, B is $(CH=CH)_Q$, C is $(COO)_S$, D is $(O.COO)_T$, P is 0 or 1, Q is 0 or 1, P+Q is 0, 1 or 2, S is 0 or 1, T is 0 or 1, S+T is 1, n is 0 or an integer of 1 to 6, m is 0, 1 or 2, X is an alkyl group having 1 to 4 carbon atoms, an alkoxyl group having 1 to 3 carbon atoms, a nitro group, an amino group, a carboxyl group, or a halogen group, (h) is cholesteryl carboxylates of carbon 4 to 7 member alicyclic compound, and (i) is cholesteryl monoesters which are hydrogen dicarboxylates of carbon 4 to 7 member alicyclic compound;

wherein the cholesteryl in (A) to (G) is represented by a formula of $C_{27}H_{45}$ and contains cholestanyl esters.

* * * * *

UNITED STATES PATENT AND TRADEMARK OFFICE
CERTIFICATE OF CORRECTION

Page 1 of 2

PATENT NO. : 5,198,148
DATED : March 30, 1993
INVENTOR(S) : Seisuke Nakano

It is certified that error appears in the above-indentified patent and that said Letters Patent is hereby corrected as shown below:

Columns 13-14, first line after heading <u>Color-forming Range Adjusting Agent</u>, change the clarity from "(-)(-)" to -- (+)(+) --.

Column 15, under heading <u>Examples of Specific-use Agent</u>, change "Ch.3,5-dichlorobenzoi acid (III)" to -- Ch.3,5-dichlorobenzoic acid (III) --.

Column 18, line 12, before 1% change "than." to -- than --.

Column 28, line 34, after 2.5% change "Ch.8-phenylpropionate" to -- Ch.β-phenylpropionate --.

Column 30, line 61, before "dopes" change "B spinning" to -- B-spinning --.

Column 32, line 16, after "50-60%" change "polyester" to -- polyolester --.

Column 38, line 41, change "4.0°C." to -- 14.0°C --.

Column 39, line 36, after "Therefore," change "he" to -- the --.

Column 40, line 51, change "claim 2" to -- claim 1 --.

UNITED STATES PATENT AND TRADEMARK OFFICE
CERTIFICATE OF CORRECTION

Page 2 of 2

PATENT NO. : 5,198,148
DATED : March 30, 1993
INVENTOR(S) : Seisuke Nakano

It is certified that error appears in the above-indentified patent and that said Letters Patent is hereby corrected as shown below:

Column 40, line 59, change "claim 6 wherein" to --claim 6, wherein--.

Signed and Sealed this

Twentieth Day of June, 1995

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,198,148
DATED : March 30, 1993
INVENTOR(S) : Seisuke Nakano

It is certified that error appears in the above-indentified patent and that said Letters Patent is hereby corrected as shown below:

Title page, item [73] Assignee: should read--

Shinko Electric Works Co., Ltd., Niigata, Japan
    Akio Tanaka, Niigata, Japan
    Shiroo Nakano, Tokyo, Japan
    Seisuke Nakano, Niigata, Japan --.

Signed and Sealed this

First Day of August, 1995

Attest:

BRUCE LEHMAN

Attesting Officer    Commissioner of Patents and Trademarks